Figure 4:
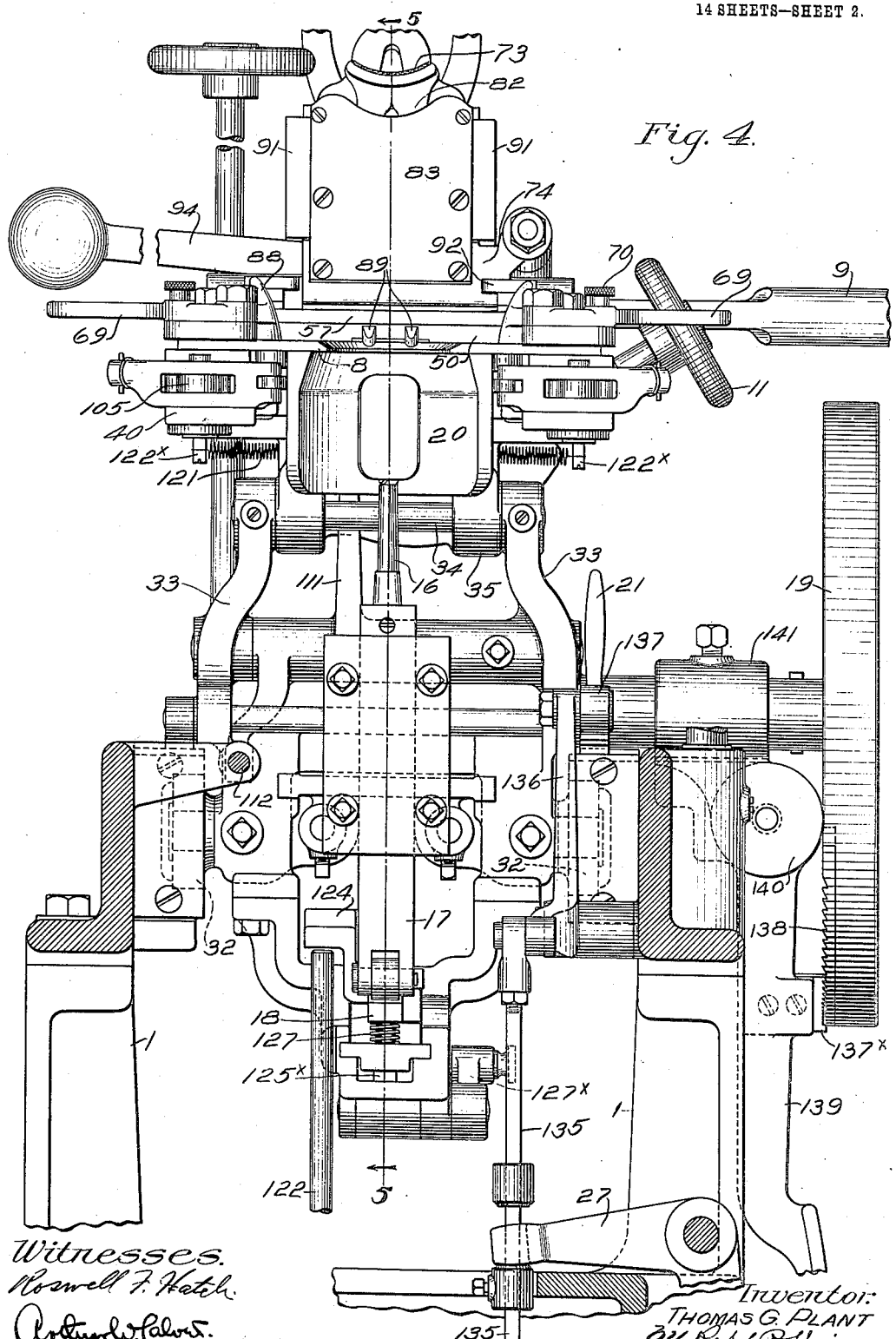

T. G. PLANT.
LASTING MACHINE.
APPLICATION FILED SEPT. 28, 1908.
958,280.
Patented May 17, 1910.
14 SHEETS—SHEET 1.
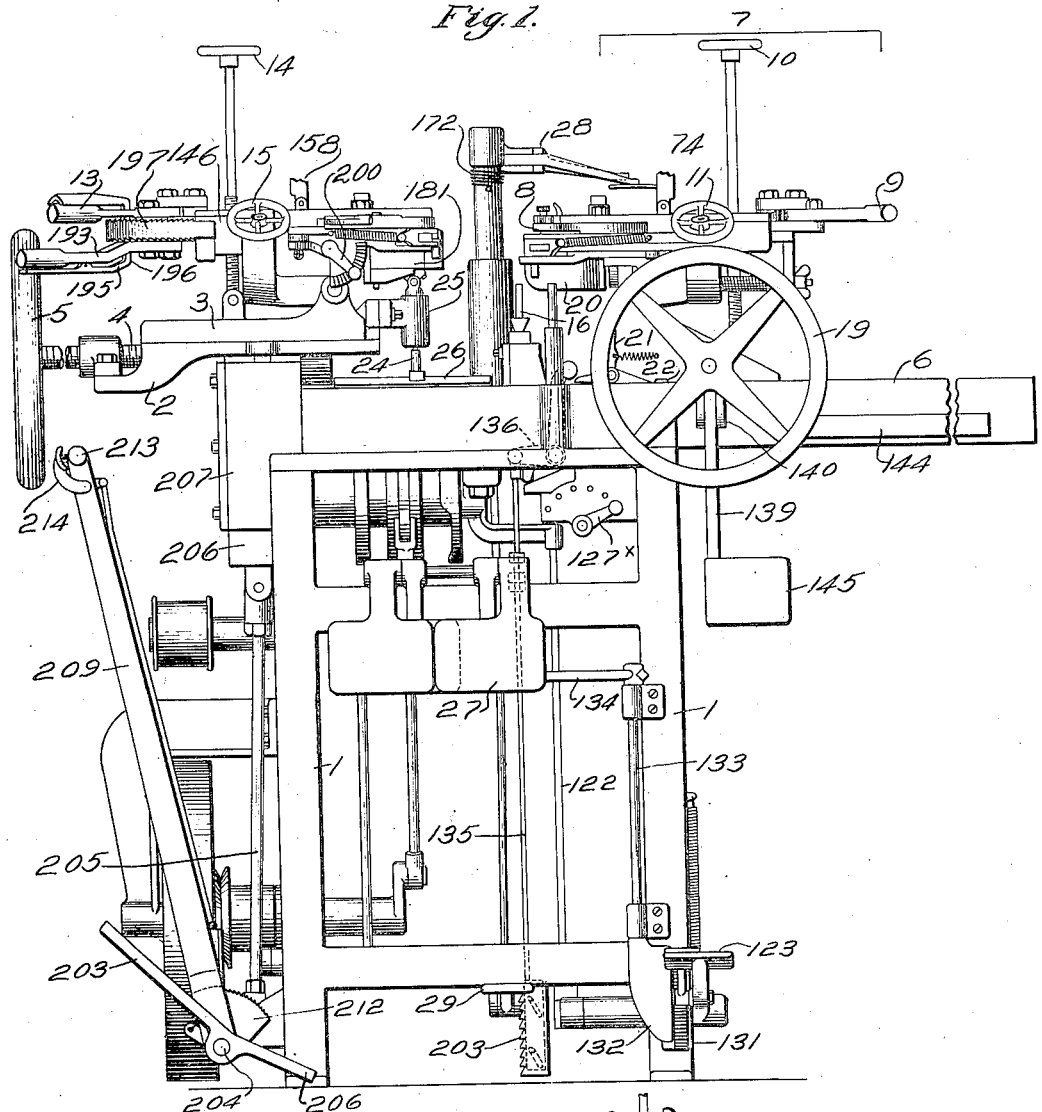
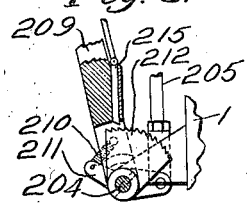
Witnesses:
Inventor,
THOMAS G. PLANT,
By Robt. P. Hains
Atty.

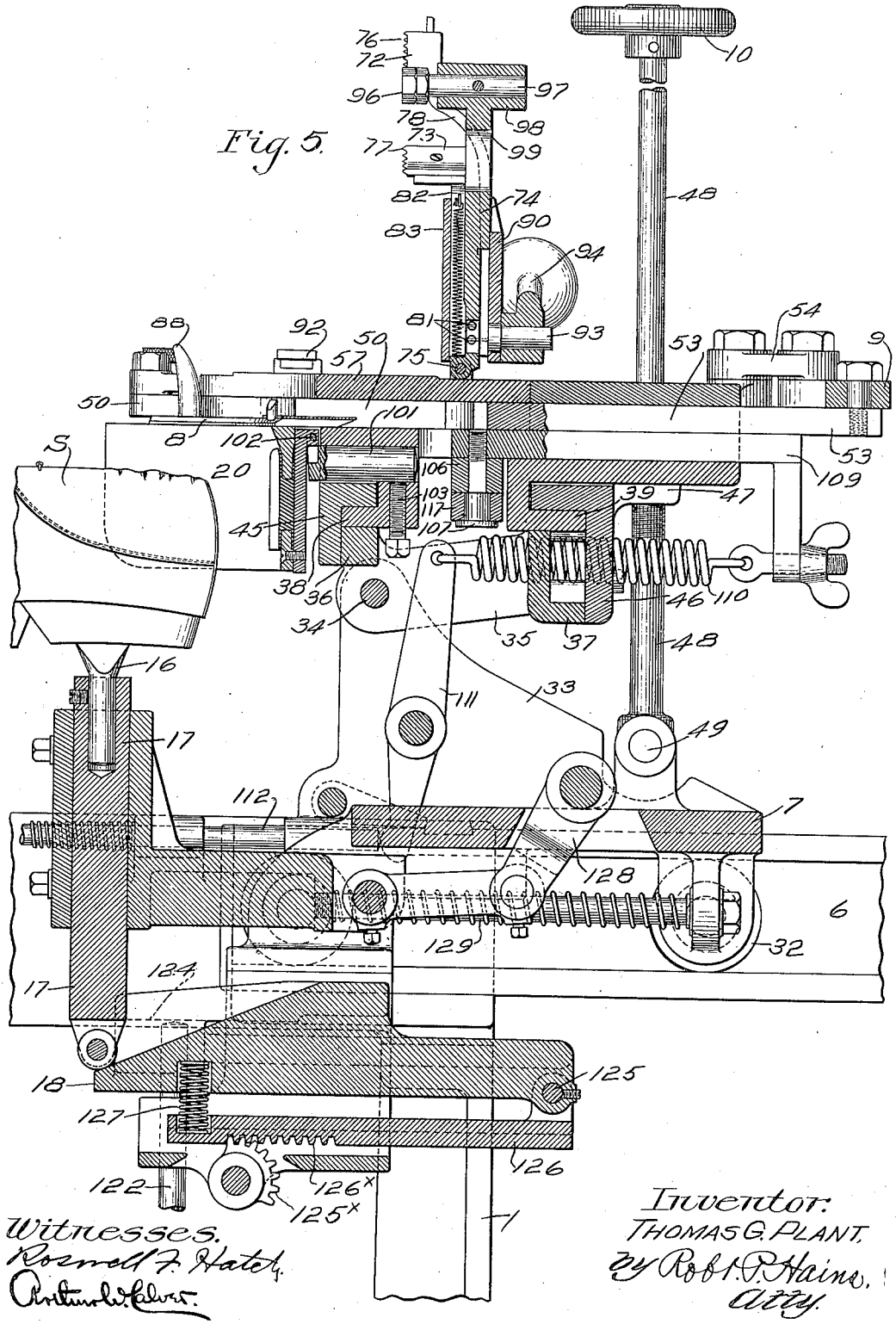

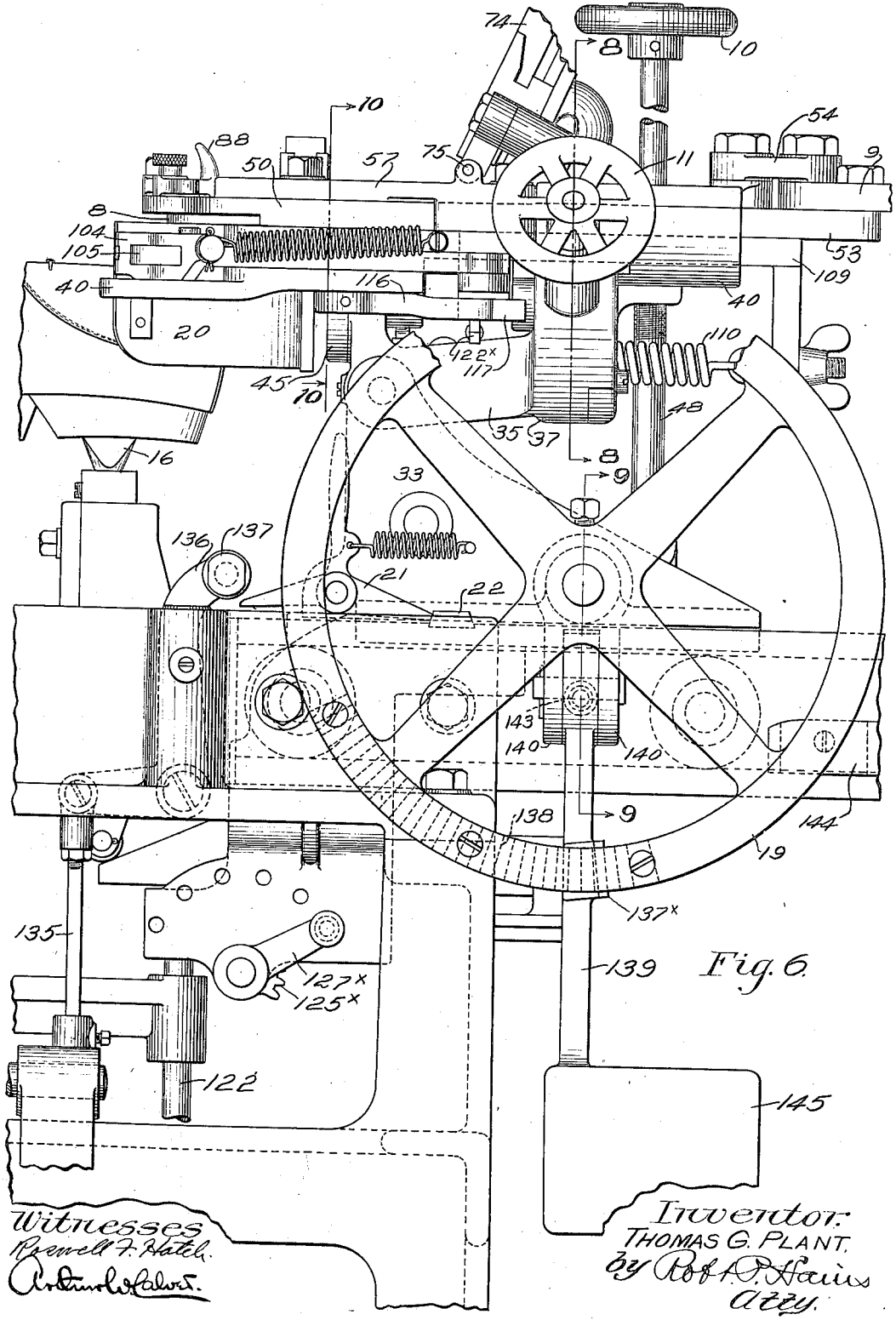

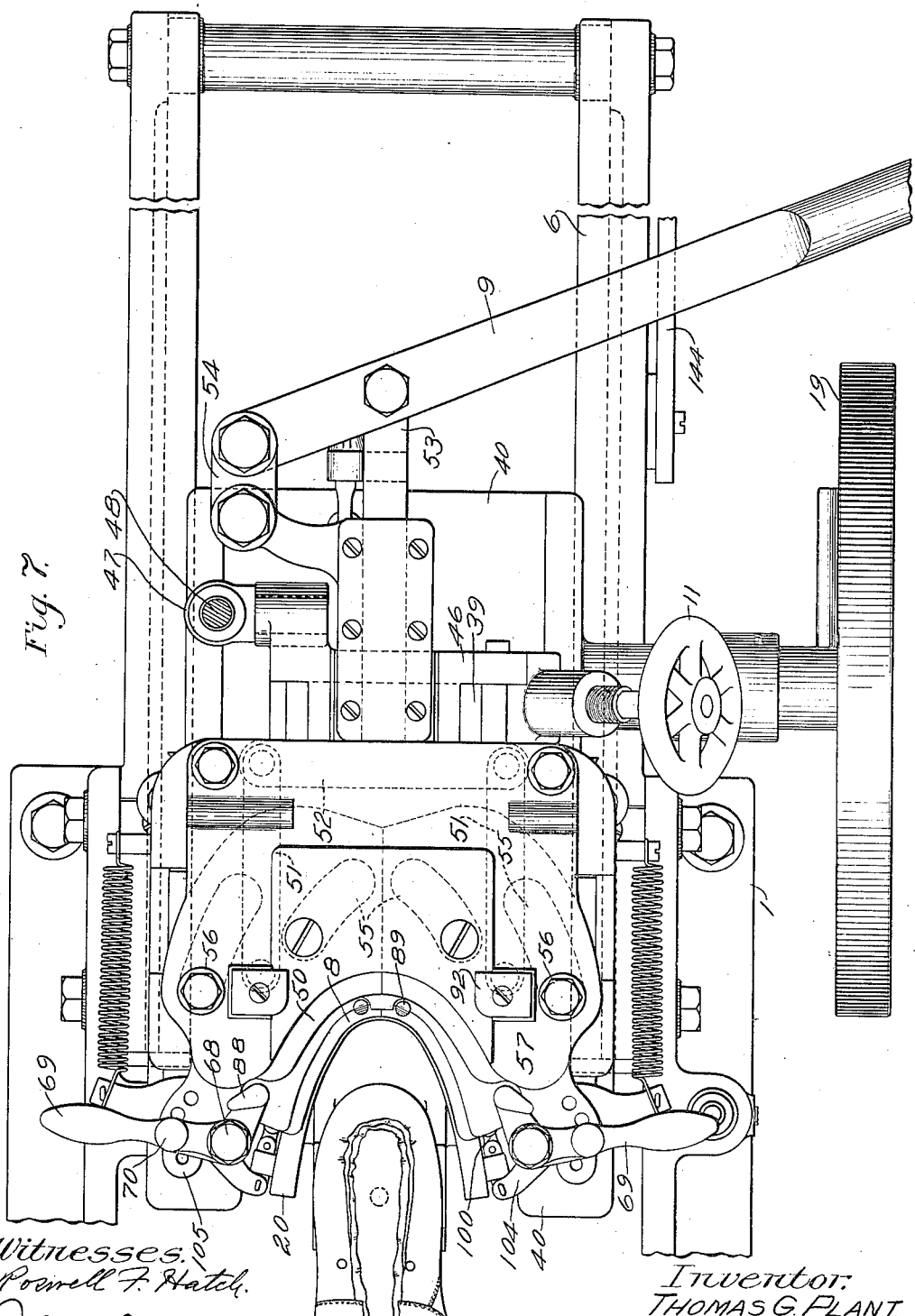

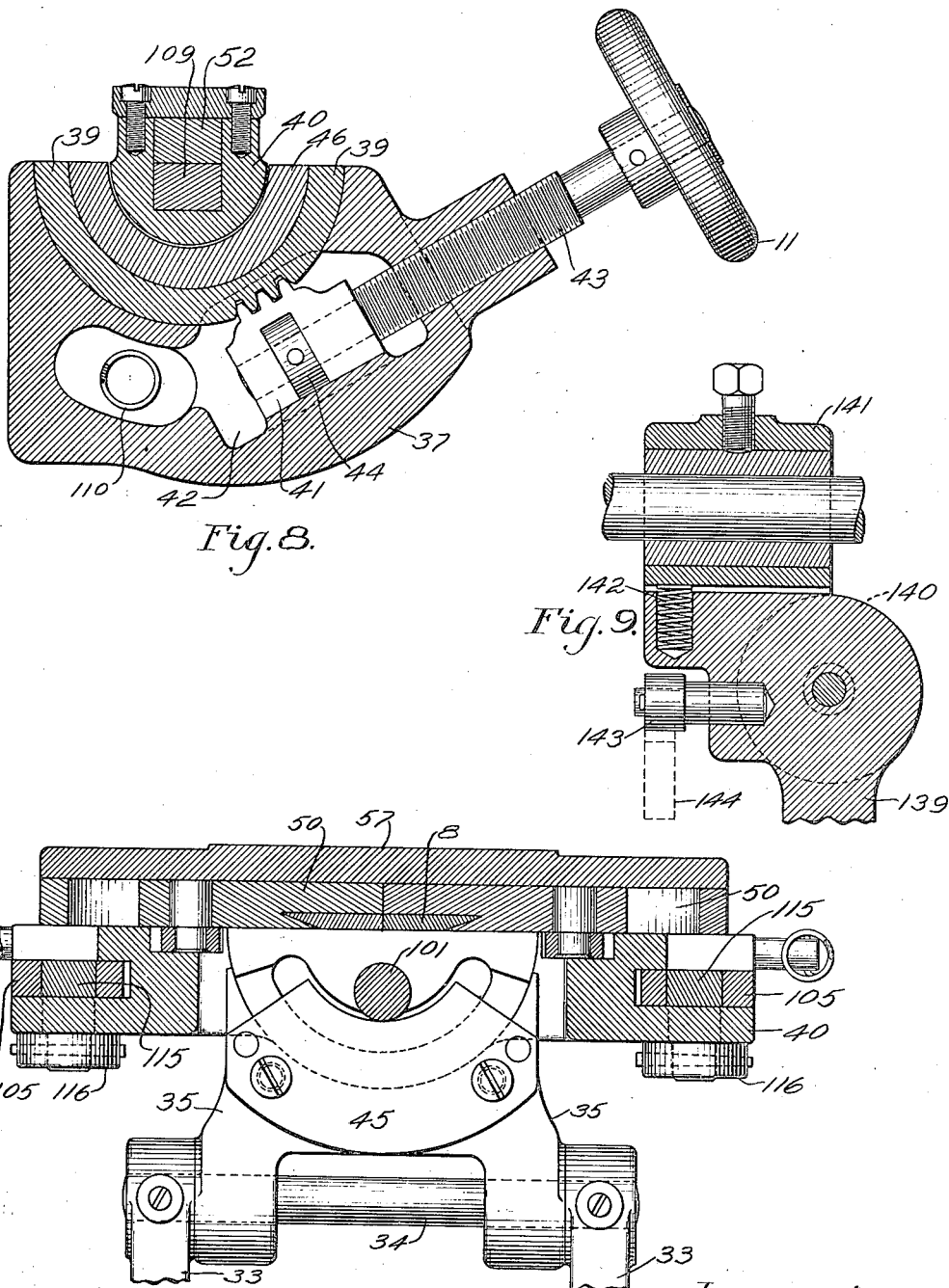

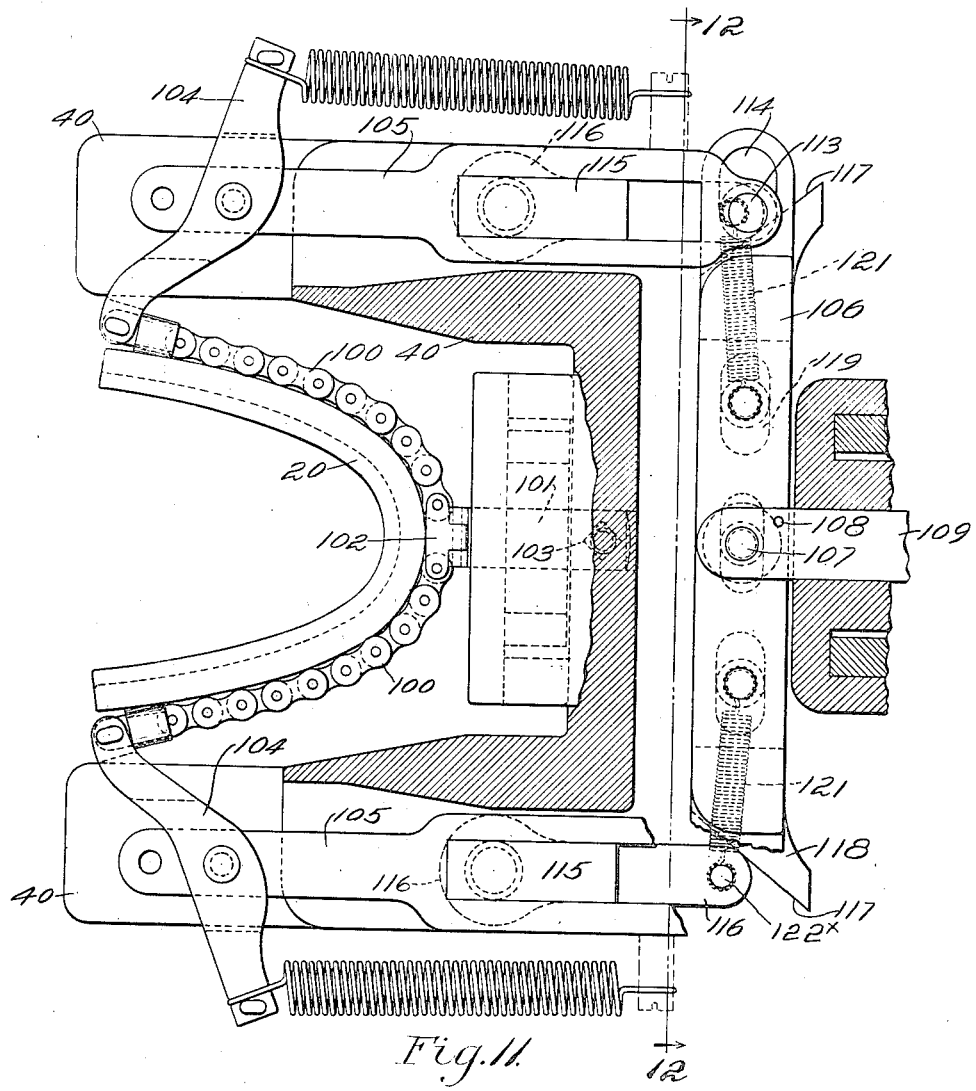

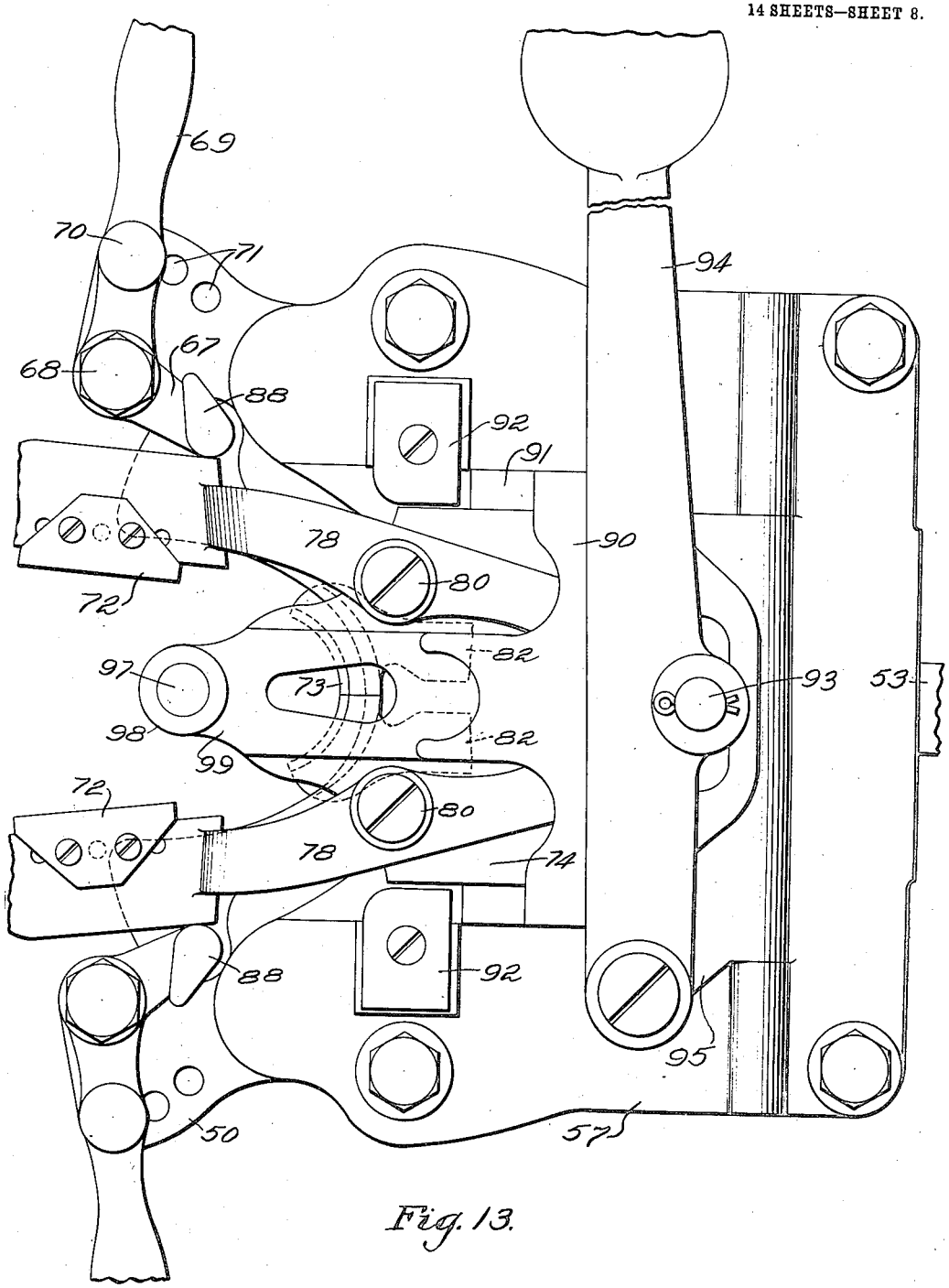

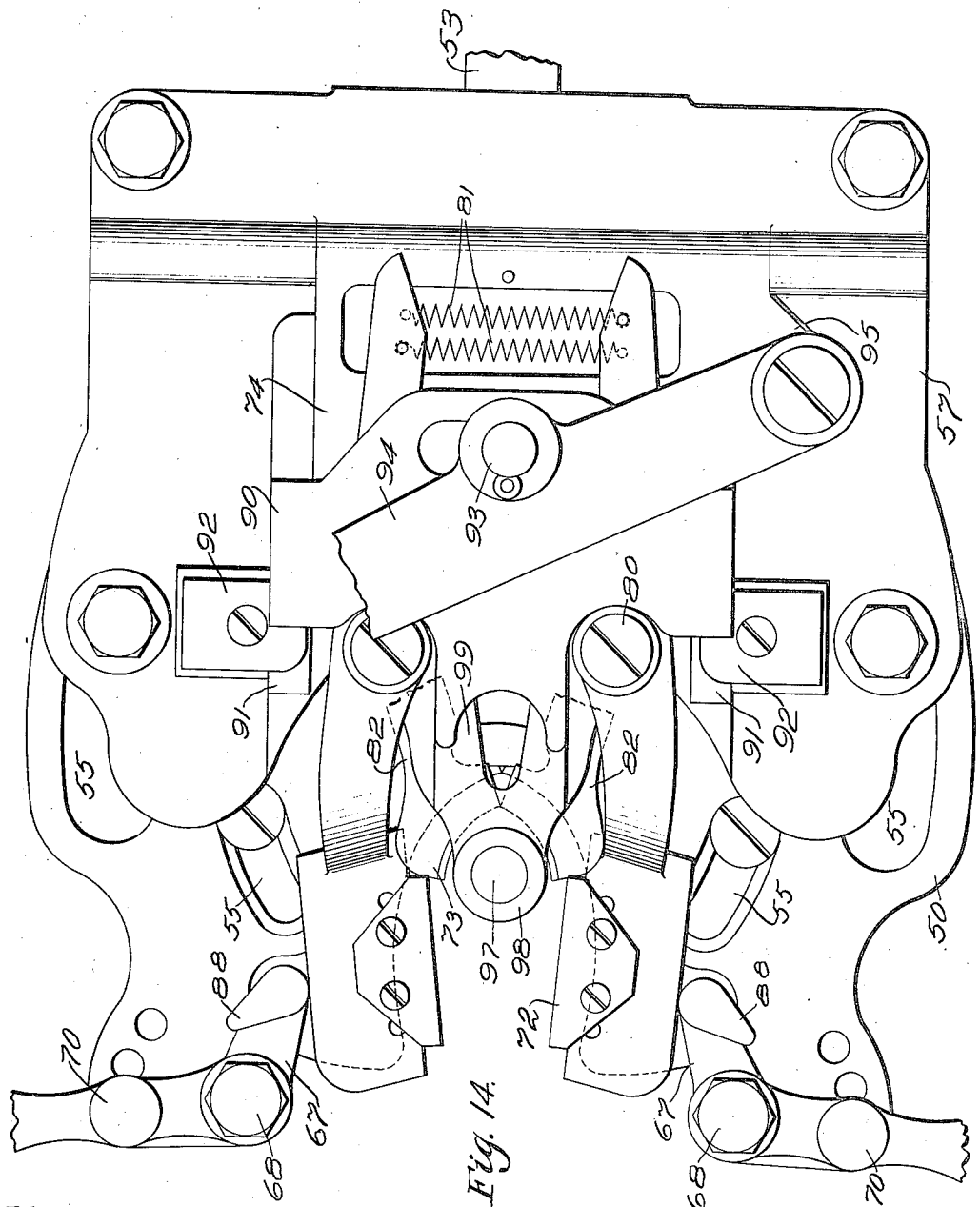

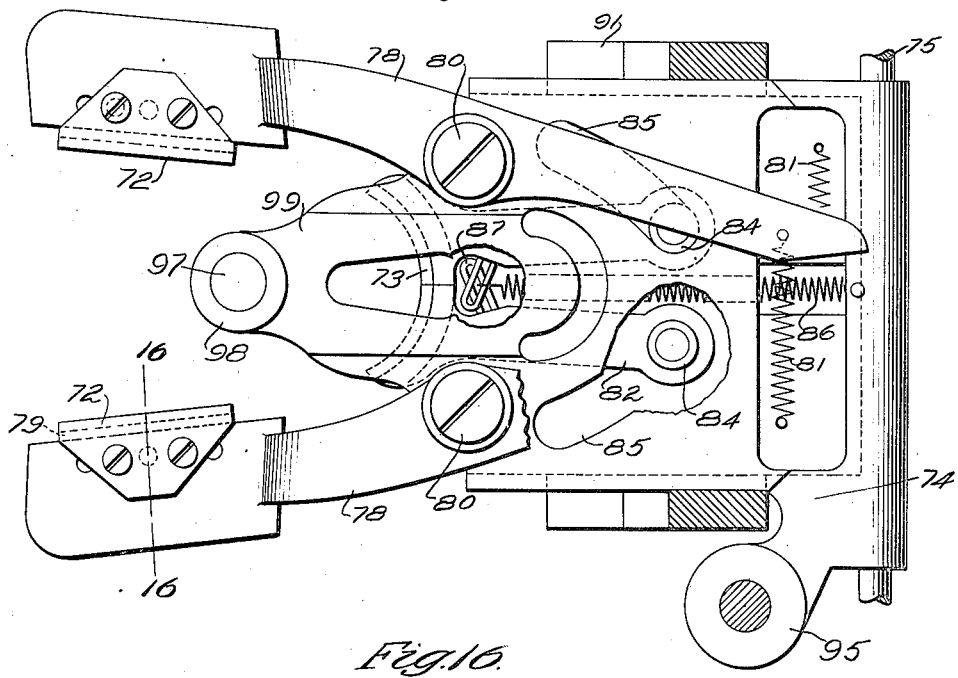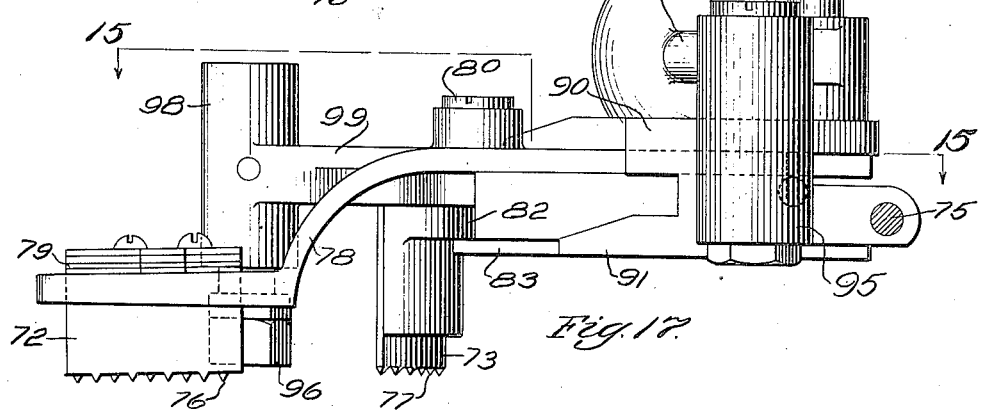

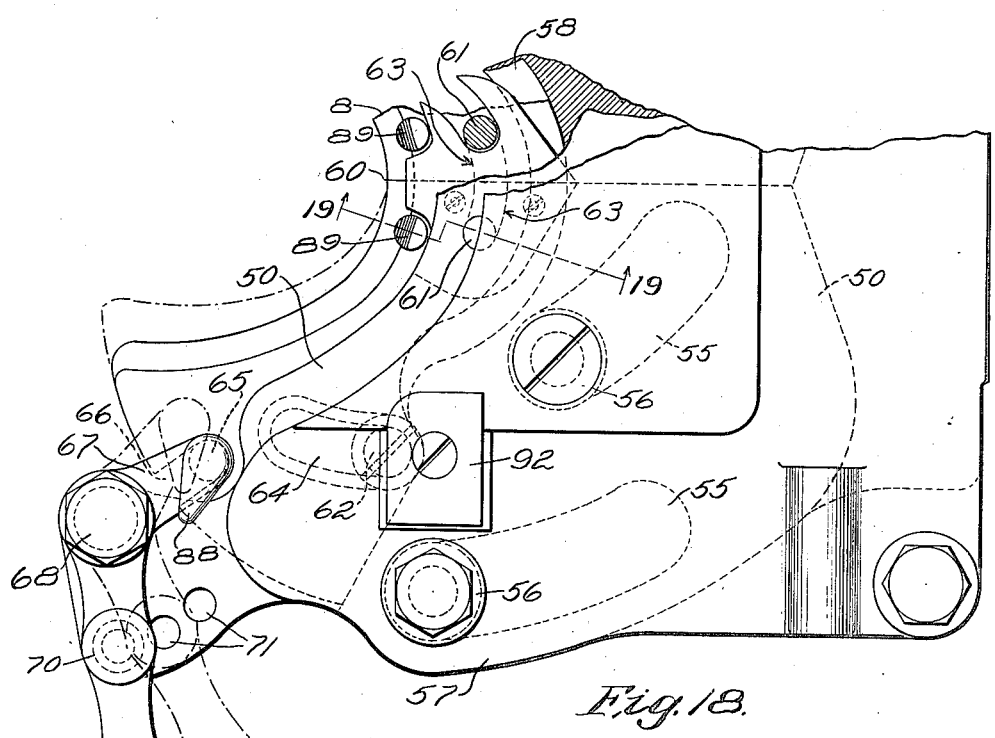
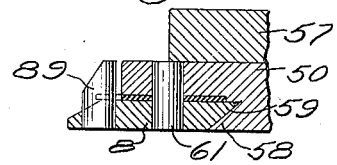
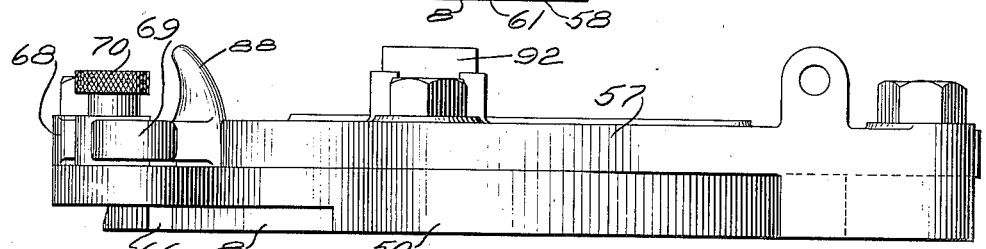

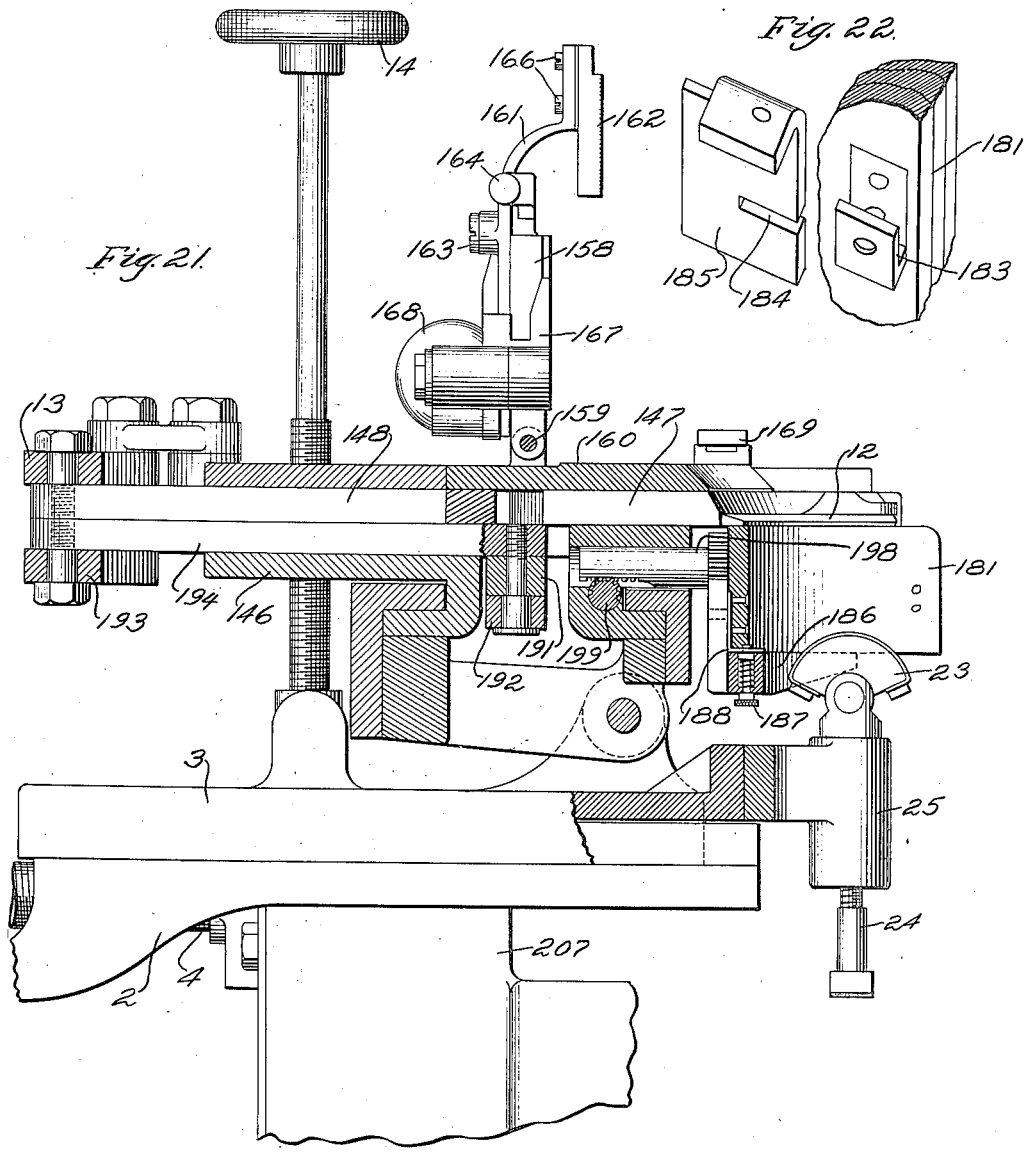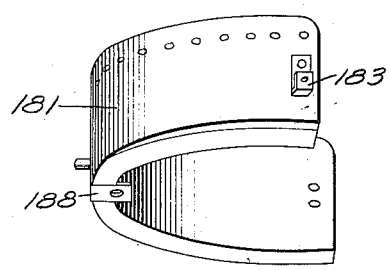

T. G. PLANT.
LASTING MACHINE.
APPLICATION FILED SEPT. 28, 1908.
958,280.
Patented May 17, 1910.
14 SHEETS—SHEET 13.
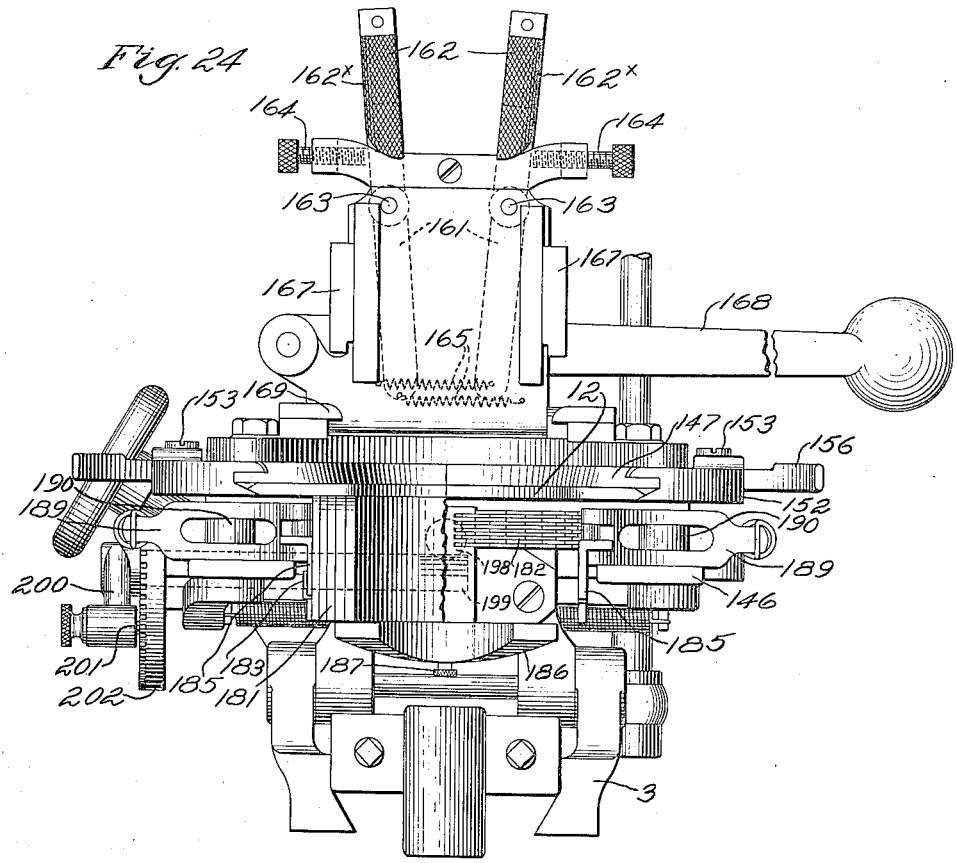
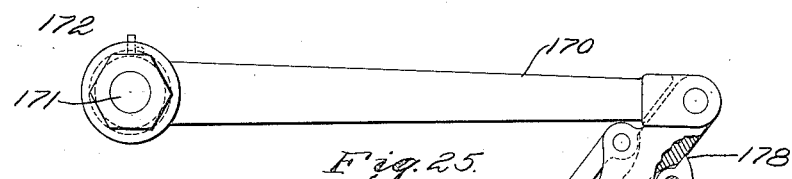
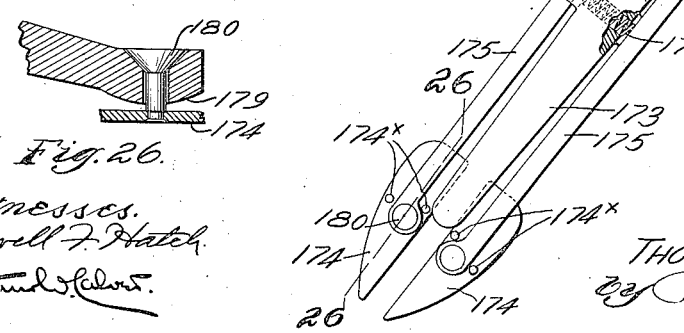
Witnesses.
Roswell F. Hatch.
Inventor.
THOMAS G. PLANT,
by Robt. F. Hains.
Atty.

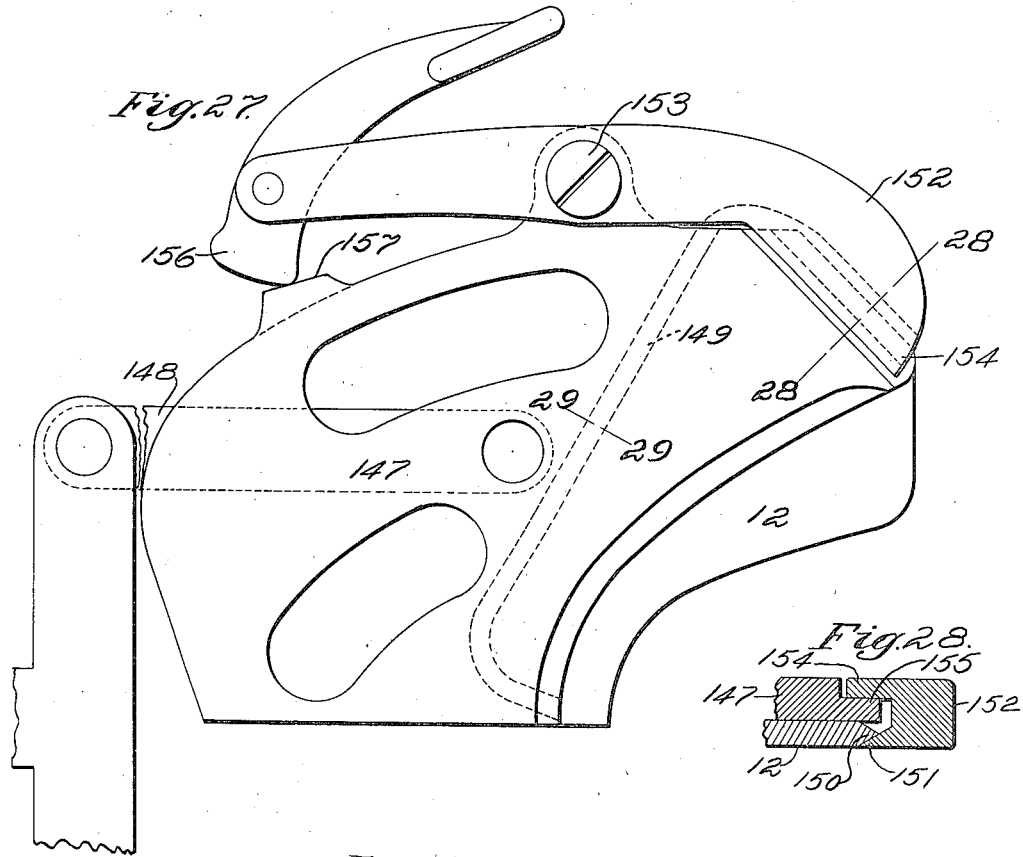
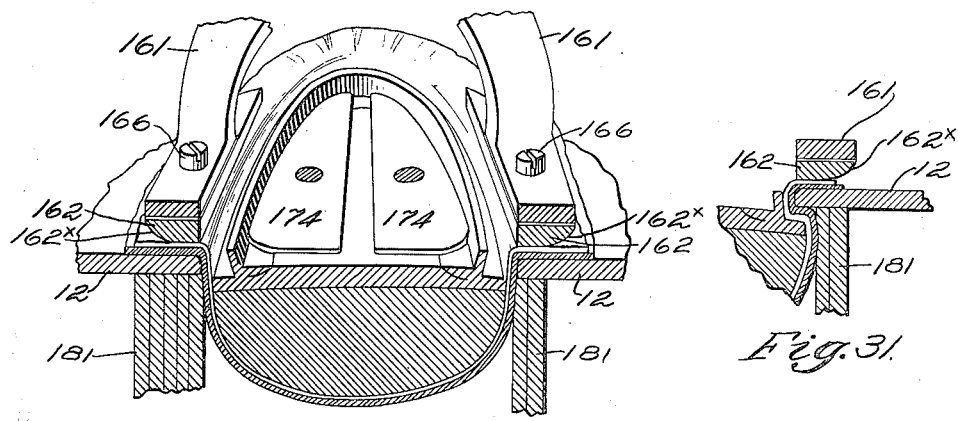

UNITED STATES PATENT OFFICE.

THOMAS GUSTAVE PLANT, OF BOSTON, MASSACHUSETTS.

LASTING-MACHINE.

958,280.

Specification of Letters Patent.   Patented May 17, 1910.

Application filed September 28, 1908.   Serial No. 455,159. REISSUED

*To all whom it may concern:*

Be it known that I, THOMAS G. PLANT, a citizen of the United States, residing at Boston, in the county of Suffolk and State of Massachusetts, have invented an Improvement in Lasting-Machines, of which the following description, in connection with the accompanying drawings, is a specification, like characters on the drawings representing like parts.

This invention relates to machines for lasting boots and shoes, and more particularly to machines of the bed lasting class employing wipers for the lasting operation.

The invention will be best understood by reference to the following description when taken in connection with the accompanying illustration of one specific embodiment thereof, while its scope will be more particularly pointed out in the appended claims.

In the drawings: Figure 1 shows, in side elevation, a typical bed lasting machine embodying one form of the invention; Fig. 2 is a detail in end elevation showing the releasing lever for the heel elevating post; Fig. 3 is a detail in sectional elevation of the elevating devices for the toe lasting head; Fig. 4 is a transverse section in elevation, on a larger scale, showing the heel lasting head; Fig. 5 is a vertical longitudinal section of the heel lasting head on the line 5—5, Fig. 4, showing a last in position on the heel pin; Fig. 6 is a side elevation of the heel lasting carriage and other parts immediately associated therewith; Fig. 7 is a plan view of the heel carriage with the supplemental carrier and lasters removed; Fig. 8 is a transverse section in elevation of a portion of the heel lasting head, taken on the line 8—8 in Fig. 6, and looking in the direction of the arrow; Fig. 9 is a transverse section in elevation of a portion of the ratchet releasing lever for the heel head, the said section being taken on the line 9—9 in Fig. 6; Fig. 10 is a transverse section of the heel lasting head on the line 10—10 in Fig. 6; Fig. 11 is a plan in partial section of the heel lasting head with portions removed to show the heel band and the actuating devices therefor; Fig. 12 is a transverse section in elevation on the line 12—12 in Fig. 11; Fig. 13 shows in plan, on a still larger scale, the relation of the heel wipers to the lasters or grippers in one position; Fig. 14 is a similar view showing the wipers and lasters or grippers in another position; Fig. 15 is a plan in section on the line 15—15, Fig. 17, showing the construction of the lasting or gripper fingers; Fig. 16 is a transverse section in elevation taken on the line 16—16 in Fig. 15, showing the construction of one of the side grippers; Fig. 17 is a side elevation of the supplemental carrier and lasting or gripper fingers; Fig. 18 is a plan view, partly broken away, showing the construction of the wipers and wiper cams for the heel head; Fig. 19 is a detail in section taken on the line 19—19 in Fig. 18; Fig. 20 is a side elevation of the wiper cams; Fig. 21 is a central longitudinal section in elevation taken through the toe lasting head; Fig. 22 is a detail in perspective showing the mode of attaching the ends of the toe band or pad to its support; Fig. 23 is another perspective showing the toe band or pad; Fig. 24 is an end elevation of the toe lasting head looking from the center of the machine; Fig. 25 is a plan view of the hold-down; Fig. 26 is a detail in transverse section taken on the line 26—26 in Fig. 25; Fig. 27 is a plan showing one of the toe wipers and its cam carrier; Fig. 28 is a detail in section taken on the line 28—28 in Fig. 27; Fig. 29 is a similar section taken on the line 29—29 in Fig. 27; Fig. 30 is a perspective showing the relation of the toe lasters to the wipers in one position of the latter during the lasting operation; and Fig. 31 is a detail in sectional elevation showing the wipers and lasters in a different position.

While many features of the invention may have general application to lasting machines of widely varied types and of materially different construction from the machine herein disclosed, for the sake of illustrating one concrete embodiment of the invention, the same is shown as applied (Fig. 1) to a well-known type of bed lasting machine, to which general type, moreover, the invention in certain of its aspects has particular and special application.

In the machine shown (Fig 1) the frame 1 is provided at the left with a suitable slideway support 2 for the longitudinally adjustable toe lasting head 3, movable from left to right to accommodate shoes of different length by the adjusting screw 4 and hand wheel 5. At the opposite end of the machine n the overhanging trackway 6 is a supporting carriage for the heel lasting head 7. The eel lasting wipers, indicated at 8, are opened and closed by the wiper lever 9, and e angularly adjustable longitudinally to commodate the spring of the last by means ntrolled through the hand wheel 10 and ljustable transversely to accommodate the ll of the last by the hand wheel 11. Simirly, at the toe lasting head for opening d closing the toe wiper plates, represented 12, there is provided the wiper lever 13, d for their angular adjustments longitunally and transversely the hand wheels and 15 respectively.

At the heel lasting carriage there is proded a heel pin 16 sustained (see Fig. 5) by e heel post 17, the latter adjustably suprted as by the underlying inclined cam wedge 18. In the employment of the maine the jacked shoe, designated at S (Fig. , is elevated on the said wedge by means ntrolled through the hand wheel 19 (Fig. and its heel retracted into the heel band , the same movement of the hand wheel ving to draw the carriage toward the cenof the machine where it is positioned by gagement between the pivoted latch 21 d the stationary catch 22 on the frame of machine. The toe of the last, when thus sitioned, is held over a toe pad 23, on the post 24, vertically slidable in the bracket on the toe lasting head. The toe post ts upon a hinged table 26 controlled by an lerlying cam and cam shaft. The details the cam shaft are not herein shown, but y be of a construction well-known in manes of this type adapted, as well underod, when the shoe has been positioned as cribed, to be set in operation by pressure the knee lever 27, to raise the toe pad 23 inst the shoe and, at the same time, clasp heel band about the heel of the shoe. hold-down 28 being then drawn down inst the upturned sole of the jacked shoe means of the foot lever 29, the shoe is ed in readiness for the lasting operation. er the leather has been wiped over the inand fastened thereto, the knee lever 27 is ssed again to turn the cam shaft, causing toe pad to be dropped, the hold-down ened and the heel lasting carriage reed and moved back to its outer position g the track 6 which carriage movement, rn, causes the heel band to open and the post to drop. These movements are understood in lasting machines of this , and the specific constructional details he mechanisms producing them require urther illustration or explanation save far as they may incidentally relate to rovements herein subsequently described. eferring first to the construction of the and toe lasting heads and the devices for ting the wipers to the roll or swing of the last, these will be best understood by reference to the heel lasting carriage and particularly to Figs. 4, 5, 7, 8 and 10. For the angular longitudinal wiper adjustment, the heel lasting carriage or base 7 (Fig. 5), which tracks upon the rollers 32, is provided at each side with upright ears 33 between which is hinged upon the transverse rod 34 the intermediate support or saddle 35. The latter comprises longitudinal arms connected by front and rear transverse members 36 and 37 respectively, which latter are formed to present curved segmental guideways (Figs. 5, 8 and 10) and afford a sliding support for the correspondingly fashioned flanged supporting portions 38 and 39, which depend from the wiper carrying support 40. The wiper support 40 can be angularly adjusted about a longitudinal axis through sliding movement of the segmental supporting flanges 38 and 39 on their curved guideways, which movement herein is imparted (Fig. 8) by a sliding rack block 41 located within a chamber 42 in the rear transverse saddle member 37, the block being provided on its upper face with teeth meshing with corresponding teeth on the under face of the supporting flange 39. The rack block may be moved in either direction from the position shown in Fig. 8 to tip the wiper support by turning the hand wheel 11 and the attached screw 43, the latter having threaded engagement with the walls of the saddle. The screw has a reduced portion adapted to turn freely in the block, but longitudinally fixed therein, by the collar 44 working in a transverse slot in the block. The supporting segments 38 and 39 are held in engagement with the guideways by flanged gibs 45 and 46 respectively, which overlie the curved upper faces of the flanged supports but are bolted to the guideway segments 36 and 37 respectively. For the angular adjustment of the wiper carrier longitudinally and about the hinge 34 the flanged gib 46 is provided with a bracket 47 (see Figs. 5 and 7), which has threaded engagement with the vertical adjusting screw 48, the latter provided with the hand wheel 10 and having a combined swivel and pivotal connection, as at 49, to the carriage 7. It will be noted that the forward segmental guide 36 and its gib 45 provide a bearing for the sidewise rocking wiper-support extending close to the heel band and well under the sliding wiper carrying cams 50.

The construction of the devices for adjusting the wipers on the toe lasting head is substantially the same as that described in connection with the heel lasting head and will be readily understood from the drawings without further explanation.

Passing now to the construction of the wipers for the heel lasting head, these are carried on the usual wiper carrying plates 130 or cams 50, which latter are secured by means of the rearwardly extending links 51, Fig. 7, the cross-bar 52 and the tail piece 53 to the wiper operating lever 9, the latter (Fig. 7) pivoted to an arm 54 secured to the wiper support 40. As usual, the wipers are given a combined advancing and closing movement by the operating lever through the provision of curved cam slots 55 (Fig. 18) in the wiper plates with which are engaged rollers 56 carried on fixed studs, the latter connecting the underlying wiper carrier 40 and the overlying plate 57, between which the wiper plates are adapted to slide. While the wipers are usually arranged in symmetrical relation to the cams so that they close in from the same position relatively to the center line of advance, in lasting shoes where the swing of the last presents wide variations between rights and lefts, so that the inside shank of the last presents a deeply retreating face, it is often desirable to shift the inside wiper and swing it inward so that it will start to close farther in toward the center line of the head. One feature of the present invention lies in the provision of means for quickly adjusting either or both wipers for different swing of the lasts, as, for instance, for rights or lefts. Various ways of securing this adjustment may be employed, but herein a wiper seat is provided (Figs. 18 and 19) on the under face of each wiper cam 50 by means of a beveled lip or shoulder 58 which underlies the beveled edge 59 of the wiper plate 8. The beveled edge of the plate and the lip against which it fits, as viewed in plan (Fig. 18), are curved preferably about the center of curvature of the cam directing slots 55. Each cam carrier is provided with studs 61 and 62 which engage curved positioning slots 63 and 64 in the corresponding wiper, the said slots having the same center of the curvature 60, so that the wipers may, if desired, either or both be adjustably swung on the cams about the point 60 which coincides with the center of opening and closing movement. Each wiper plate is held adjustably fixed on its carrying cam by any suitable means such, for example, as the down turned locking pin 65 which engages a suitably shaped slot 66 in the outer edge of the wiper plate to hold the latter rigidly fixed. The pin, however, is carried by an arm 67 pivoted at 68 upon the wiper carriers and provided with the handle 69 and the removable positioning pin 70, which latter may be inserted in any one of several openings 71 in the wiper carrier to variously fix the position of the locking arm. With the positioning pins in the outer one of the openings 71 (as shown in Fig. 18), the wiper plates are held in their normal positions symmetrically arranged relatively to the central plane of the head and with their inner edges in contact. By withdrawing its positioning pin 70 and turning its locking levers 67 to a different position, however, either wiper may be swung inwardly, as, for example, to the position shown by dotted lines in Fig. 18, thereby causing it to start and finish its closing movement nearer the center line of the last.

In the disclosed machine there are provided, in addition to the wipers, auxiliary lasting devices which act to increase the draft on the stock when wiped over the last, as well as to direct the draft inward over the shank and rearward toward the center of the heel seat, such auxiliary devices also herein preferably being employed to prevent the slackening of the stock when the wipers are backed off and partially withdrawn preparatory to applying the fastening. Herein the said auxiliary devices comprise (see Figs. 5 and 15) pairs of grippers 72 for increasing and directing the draft on the stock at the side of the heel near the shank, and additional grippers 73 for increasing the draft at the end or rear of the heel. Both pairs are mounted upon the supplemental head 74, hinged by the rod 75 to the heel lasting head so that they may be thrown up out of the way into the position shown in Fig. 5. The grippers are provided with down turned lips presenting gripping means, such as the points 76 and 77 respectively, which, when the head is turned down (Fig. 13) are adapted to penetrate and positively engage the stock in front of the working edges of the wipers and to be moved in and over the last (Fig. 14) in advance of the wipers. The side grippers 72 are removably bolted or screwed to the ends of fingers 78, provision being made for adjustment to accommodate different thicknesses of stock, by interposing one or more removable shims 79, and for longitudinal adjustment to change the reach of the grippers toward the shank of the last by providing a plurality of screw holes in the fingers. The fingers 78 are pivotally secured to and above the head 74 by means of studs 80 and have their rearwardly projecting ends drawn together by springs 81 which tend normally to spread apart the side grippers, as shown in Fig. 15.

The heel lasting grippers 73 are carried on arms 82 which have sliding movement between the head 74 and the underlying plate 83 (Figs. 4 and 5) secured thereto. When the heel grippers are advanced, as will be described, their movement is directed by rollers 84 carried by the rear ends of the arm 82 and engaging curved guideways 85 formed in the head, the guideways being located in such relation to the directing slots for the wiper cams that the heel lasting grippers execute a closing-in movement conforming to that of the wipers. The heel lasters are normally retracted to the open position shown in Fig. 15 by the spring 86 having one end fixed to the head and the other connected in common to the pins 87 fastened one to each of the arms 82.

When the supplemental head 74 is turned down to use the lasters, the grippers 76 are guided into position (see Fig. 13) to overhang the front edge of the wipers by contact between the outer beveled edges of the down-turned gripper lips and the upright horn-shaped abutment 88 presented by the locking lever 67 on each wiper carrier. Likewise the grippers 73 are positioned to overhang the wiper edges by guiding contact with the beveled top edges of the upright pins 89 carried each by one of the wiper plates (see Figs. 5 and 18). In this position of the grippers, any closing-in movement of the wipers will be accompanied by a corresponding closing-in movement (see Fig. 14) of the grippers due to the pressure of the abutments 88 against the side grippers and the pins 89 against the heel grippers, the said pins and abutments acting as the means for advancing the grippers over the last.

Means are provided to depress the grippers at will and cause the points 76 and 77 to penetrate and grip the stock. This is accomplished by providing on the head 74 a cap plate 90 adapted to slide lengthwise the head. The cap plate is provided with shoes 91 underlying the edges of the head, which shoes present, each on its upper face, an incline adapted to engage with the under side of an overhanging ear 92 (see Fig. 7) the latter bolted to the plate 57 on the wiper support, so that, with the lasters turned down and the cap plate advanced, the inclined shoes will forcibly depress the entire supplemental head about its hinge and cause the laster points to dig into and take hold of the stock. To advance the sliding cap for the depression of the grippers, the cap has jointed attachment at 93 (Figs. 5 and 13) to the hand lever 94, the latter pivoted on the bracket 95 which is secured to the head 74.

Means preferably are provided and associated with the grippers to position or level the shoe with respect to the lasting devices and acting also to prevent such an approach of the gripper teeth to the insole as might cause them to penetrate too deeply and tear the stock. Such means are herein comprehended in a down hold foot comprising the adjustable head 96 carried by the threaded in 97 depending from the bracket 98. The latter is supported by an arm 99 on the supplemental head between the lasters, so that the down hold may be depressed against the upturned insole at the heel seat and beyond the range of wiper action. By adjusting the head 96 on the pin the penetration of the gripper into the stock may be regulated.

In the use of the heel lasters, the head having been swung down, the lasters assume the relation to the wipers represented in Fig. 13. The hand lever 94, being then swung over to the position shown in Fig. 14, causes the teeth of the lasters to grip the stock and, when the wipers are advanced, move from the position shown in Fig. 13 to that shown in Fig. 14. In executing this movement the heel lasters advance and close in substantial correspondence with the wipers supplementing the frictional hold of the latter. The side lasters, not only likewise increase the draft on the stock, but, being pivoted on the supplemental head and projecting (Fig. 13) well beyond the forward limits of the wipers, engage portions of the stock not initially touched by the wipers, which portions, however (see Fig. 14), are drawn or held back into the range of wiper action at the close of the wiper advance. With end wipers, as ordinarily used, the draft upon the stock, while inward over the insole, is also forward, this tending to slacken the stock overlying that portion of the last not reached by the wipers until near the close of their movement, as, for example, adjacent the inside shank portion of the shoe. Since the side grippers have a closing-in movement only, while the wipers both close in and advance, the side grippers act to draw the stock relatively toward the advancing wipers, preventing the forward draft, due to the advance of the latter, from slackening the stock over the fore portions of the heel seat. Thus, through the use of the auxiliary lasters, the stock from all sides of the heel, including the inside concaved portion of the shank, can be drawn in snugly toward and over the heel seat and can be broken down by the advancing wipers. Having wiped in the stock as described, the operator may now return the wipers to a position near the edge of the insole preparatory to applying the fastening. The depression of the lasters, due to the cam plate 90, causes them to remain fixed on the retraction and opening of the wipers, preventing such wiper movement from being accompanied by any slackening of the stock. With the wipers retracted, the lasting lever 94 may be swung back to release the lasters and the head 74 raised to permit application of the fastening.

In the case of lasts having an extreme swing, it will often be necessary to adjust the grippers so that the movement of the inside gripper, like that of the inside wiper, shall be started nearer the center line of the last. While such adjustment might be independent and separate, herein it is made automatically consequent on the adjustment of the wiper plates for, with either of the latter shifted to one side of its normal position, when the head is depressed, the corresponding lasters will still find their proper positions by engagement with the abutment 88 and pin 89 and lie closely adjacent the active edges of the wipers, as shown in Fig. 13. The beveled top of the pins 89 and of the horn 88 is so shaped that the lasters are correctly positioned and properly advanced in whatever position of adjustment the wiper plates may be placed.

Referring now to the heel band 20 for the heel lasting head, the same comprises (Figs. 5 and 11) a pad or facing of leather or other suitable material supported by the flexible sprocket chain or carrier 100. The latter is suitably supported by the rearwardly directed pin 101 on which it is hinged by the link 102 so as to rock slightly for adaptation to the last. The pin is adjustably held in the wiper support by the set screw 103. The ends of the pad carrier are jointed to the pad supporting fingers 104 (see Figs. 5, 7, 11 and 12) which are pivoted to the ends of the pad supporting arms 105, the latter being slidably mounted in the wiper support 40. The supporting arms are advanced to clasp the pad about the heel by means of the connected cross bar 106, the latter rigidly secured, as by the stud 107 and pin 108 (Fig. 11), to the sliding actuating bar 109. The actuating bar is connected to be moved by the cam shaft of the machine through suitable connections, such as the spring 110 and lever 111, the latter moved by the plunger rod 112 actuated by a cam (not shown), as is customary in this type of machine. The cross bar 106, being rigidly fixed on the actuator bar 109, the sliding arms are advanced equally and together. Means, however, are provided to cause the arms to turn to one side or the other, if necessary, to permit the pad to conform to the swing of the last. To effect this, the studs 113, which connect the arms to the cross bar, work in slots 114 and each arm 105 fashioned to slide on a guiding block 115, the latter pivoted to turn on the wiper support 40, but secured beneath the same to a rearwardly projecting arm 116, which has an end contacting with the inclined face 117 of a wedge bar 118. The latter is secured to the under face of the cross bar 106 by the stud 107, but is permitted sliding movement lengthwise the bar by provision of the slots 119 and guide rollers 120 (Fig. 12). As the cross bar is advanced, the wedge acts to turn the guiding blocks 115 and swing the supporting ends of both arms 105 inwardly to clasp the ends of the pad about the last. Springs 121, connecting the lower ends of the roller studs and depending pins 122$^x$ on the ends of the arms 116, normally tend to keep the wedge central and the band symmetrical relatively to the axis of the head. If the heel band, however, requires to be shifted to meet the swing of the last, the resistance to the advance of the wedge on one side or the other causes it to slide crosswise and turn the guiding blocks unequally to give a differential swing to the supporting arms and automatically adapt the pad to the heel.

After the shoe has been jacked, as previously described, it is usual to provide means such as the elevating rod 122 to press the last up against the wipers. The rod herein is elevated by the foot treadle 123 (Fig. 1) to cause the upper end thereof (Figs. 4 and 5) to engage with the overlying lateral horizontal straight ledge 124 on the elevating wedge 18 and thereby lift the heel post and last. To permit this the wedge 18 is pivoted at 125 to the heel lasting head on the forwardly adjustable support 126, the forward end of the cam being yieldably supported by the preferably light spring 127. The wedge may be adjusted lengthwise the carriage to vary its lifting effect on the heel post by the segmental pinion 125$^x$, meshing with a rack 126$^x$ on the under side of the wedge support 126 and controlled (Fig. 6) by the external wedge controlling lever 127$^x$, (Fig. 1). Since the ledge 124 is of sufficient extent to overlie the elevating rod for all positions of the wedge, the rod engages with the latter irrespective of the adjustment of the wedge.

The lifting rod treadle 123 is provided (Figs. 1 and 2) with the pawl 130 coöperating with the ratchet 131 so as to maintain the up-pressure on the last without further exertion on the part of the operator. To provide for the automatic release of this up-pressure coincidentally with the release of the carriage and the dropping of the toe post, there is provided the treadle releasing arm 132 adapted to be moved to release the pawl from the ratchet. The arm is fixed on the rock shaft 133 (Fig. 2) and is given a releasing movement on movement of the carriage-releasing knee lever 27, which latter, when moved to release the carriage, engages with the finger 134 located back of the knee lever and secured to the rock shaft 133. Movement of the knee lever acts to release the carriage (Fig. 4) through the upright rod 135 connected to throw the bell-crank lever 136 pivoted on the frame of the machine. When thrown, the lever 136 causes a roller 137 to strike the latch 21 and free the same from the catch 22, Fig. 6.

The last support when elevated and retracted in the heel lasting head is retained in such condition by the pawl 137$^x$ (see Figs. 4 and 6) which engages with ratchet teeth 138 on the inside face of the hand wheel 19. The pawl is carried on the depending lever 139 which is pivoted between ears 140 on the journal for the hand wheel shaft. The pawl 130 is pressed into engagement by the spring 142 (Fig. 9), but is thrown out of engagement to effect automatic release of the heel band and the lowering of the last support when the roller 143 (Fig. 9) on the lever 139 meets the curved top edge of the cam plate 144 fixed to the side of the trackway 6. To provide for the release of the hand wheel at any time by the operative independent of the carriage position, the pawl carrying lever is prolonged at its lower end and carries the portion 145 adapted to be pressed by the knee of the operative at any time to effect the release of the hand wheel.

Turning now to the toe lasting head, the toe lasting devices are mounted upon the wiper support 146, which is adjustable by means of the hand wheels 14 and 15 in substantially the same fashion as described with reference to the heel lasting head. The wiper plates 12 (Figs. 21 and 27) are supported upon cam carriers 147, and the latter are given a combined advancing and closing-in movement by means of the sliding actuating bar 148 and wiper lever 13 in the usual manner. Means are provided, however, for removably securing each wiper plate to its carrier so that, while rigidly seated thereon, it may be quickly detached for the substitution of a wiper of different shape. Herein (Figs. 27, 28 and 29) the under face of each cam plate 147 is provided with a recessed shoulder 149 and the rear edge of the wiper plate is fashioned to seat against said shoulder and against the flat under side face of the carrier. To removably hold the wiper against its seat, the lateral edge of the wiper is beveled as at 150 (Fig. 28) and is engaged by the underlying beveled lip 151 of the clamping member 152, which latter, being pivoted upon the carrier as at 153, may be swung into or out of engagement with the wiper edge. The clamp also has the shoulder 154 which swings over the shouldered edge 155 of the carrier, and it acts, therefore, not only to seat the wiper in the recessed shoulder 149, but also to force or wedge the wiper against the adjacent flat face of the carrier. When the clamp is swung away from the wiper the latter may readily be withdrawn from its seat. To force and hold the clamp in its clamping position suitable means are provided, such as the pivoted cam lever 156, the suitably fashioned end of which is adapted to engage the lug 157 projecting from the edge of the wiper carrier. The cam lever when drawn to the position shown locks the clamp against the wiper, but movement of its free end outward will act to release the clamp lever.

In the disclosed lasting machine the toe lasting head, like the heel lasting head, is provided with lasting devices supplementary or auxiliary to the wiper plates, and, like the auxiliary heel lasting devices, these are also mounted upon a supplemental head 158 pivoted at 159 to the cap plate 160 overlying the toe wiper cams. The auxiliary lasting devices for the toe head comprise the lasting arms 161 (Figs. 21, 24 and 30), carrying at their free outer ends the work engaging members 162 which, when the head is turned down, are adapted to rest upon the overturned edges of the stock. These members 162 are preferably formed so that when turned into operative position, they will rest at one portion of their length upon the outturned material on top of the wipers, and at another portion press upon the outturned material at the edge of the wiper or even on the insole in front of the wiper edge. The outer longitudinal edge of these auxiliary devices is preferably beveled or cut away, as at $162^x$, Figs. 30 and 31, so that as the wipers move in they may readily wedge under the outturned material and auxiliary lasting devices, lifting the latter if necessary. Of course, if desired these auxiliary lasting devices may be formed to rest upon the outturned material above or on top of the wipers throughout their length. The arms are pivoted at 163 to the supplemental head, so that the members 162 are permitted a closing-in movement with the wipers, although normally drawn out against the adjustable stop screws 164 (Fig. 24) by the springs 165 attached each at one end to an arm and at the other end to the head. The work engaging members 162 are removably secured to the ends of the fingers 161 by screws 166 and with interposed shims, so that members of different shapes may be supplied to accommodate different forms of wipers or suit different conditions of use. The work engaging members are herein arranged to increase the frictional hold of the wipers, especially near those advanced portions which work at the side of the toe, without, however, affecting the smooth wiping action of the under or active wiper faces. To this end the under or active faces of the work engaging members 162 are so fashioned or equipped that when depressed against the overturned edge of the stock above the wipers, as represented in Fig. 30, they act to pinch the stock against the wipers and act to increase the draft on the stock by retarding its slippage over the wiper edges as the latter advance and close in. In the illustrated instance the lower edges of the work engaging members are merely roughened, although obviously they may be provided with teeth or faced with leather or other friction material according to the nature of the work and the conditions of use.

The supplemental head is provided with devices to depress and apply the lasting members 162 to the work. These comprehend the sliding cap plate 167 controlled by the hand lever 168 and constructed substantially the same in this respect as the supplemental carrier in the heel lasting head, so that, when turned down, the hand lever may be moved to cause the cap plate 167 to engage the overlying ears 169 and depress, and hold depressed, the grippers 162 against the stock. The arms 161 are preferably constructed with more or less resiliency so that, when depressed, the work engaging members exert a firm but suitably yielding pressure against the stock.

When the auxiliary toe lasting devices are employed, with the shoe positioned and ready for the wiping operation, the free edge of the stock is reversely laid over the wiper edges, as represented in Fig. 30, and the lasters then depressed to pinch the stock against the wipers. If the wipers are then closed in they stretch and lay the stock over the insole as usual, but with the additional draft imparted by the yielding grip of the overlying work engaging members. As the wipers move in, and the stock slips over the edge of the wipers, the stock as well as the in movement of the wipers, tends to draw the lasting arms in more or less (see Fig. 31) against the opposing pull of the springs 165 by the friction-creating pressure of the lasters against the wipers. With the stock wiped in as described, the lasters may be released by the hand lever 168 and thrown back out of the way to permit retraction of the wipers and the application of the fastening.

In the usual lasting machine employing end wipers it is difficult, particularly at the toe, to avoid a tendency of the stock to slacken and loosen at the sides of the last, as for example, at or adjacent the toe cap seam when the toe is lasted. This is not only due to the fact that the inward draft of the wipers is the least effectual at the sides of the toe and adjacent the advanced portions of the active wiper edges, but also to the fact that, with the wipers advancing as well as closing in, there is an extreme draft rearward and away from the tip, which tends to work the stock from the tip rearward and to loosen it at the sides beyond the range of the wipers. The described construction of auxiliary lasters not only obviates this by increasing the frictional grip of the wipers at their most advanced edges where most needed, but, since the lasting arms 161 are pivoted to the supplemental head and do not advance with the wipers, the work engaging members, while augmenting the inward draft, tend to hold back the stock at the sides of the toe and prevent it from being stretched or drawn away from the tip with and in the direction of wiper advance. It will be obvious that these described features of the invention, while of particular importance in lasting the toe, are not limited in their application to toe lasting devices, but may be employed, if desired, in connection with the lasting devices for the heel.

In conjunction with the toe lasting devices there is preferably employed a hold-down adapted to engage the insole between the wiper plates. Such hold-down is herein pivotally mounted on the usual swinging arm 170 (Figs. 1 and 25) secured to the upright rod 171 and normally swung outward to throw the hold-down away from the last by means of the spiral spring 172. The hold-down arm 173 (Fig. 25) is pivoted to the end of the swinging arm 170 and carries two insole-engaging members 174 suitably shaped to engage the insole between the wipers. The members 174 are each mounted upon a lever arm 175 pivoted at 176 to the arm 173, and normally spread apart by the spring 177 to the position shown in Fig. 25 where the stops 178, on the levers, abut against the arm. This provides means for adjusting the insole engaging portion of the hold-down to apply it to toes of varying widths, for the operative, in applying the hold-down, can grasp the levers 175 and draw the insole-engaging portions toward each other to adapt them to a narrow toe or allow them to spread apart to cover any desired insole area, limited only by the location of the stops 178. In order to provide for an even pressure against the insole by the hold-down, each member 174 is preferably secured to its lever by means which permit relative rocking movement, such, for example, as the spherical seat 179 (Fig. 26), connection being maintained by the rivet 180. This permits the hold-down to adapt itself to insoles of varying curvature and shape due to the variations in the spring of the last, the stop $174^x$ being provided to limit swinging movement of the plates 174 by contact with the arms 175 and maintain the plates in alinement with the shoe. The hold-down, when swung over the last, may be drawn forcibly down against the insole and there locked by the foot treadle 29 suitably shaped to engage the teeth on the holding ratchet 203. The ratchet, however, is mounted to swing away from the foot treadle and release the hold-down when the rod 135, to which it is connected, is elevated. The upper end of the rod is connected to the knee releasing lever 27 (Fig. 4) so as to be raised for the release of the hold-down simultaneously with the release of the heel lasting carriage and the elevating rod 122.

While many features of this invention are not limited to any particular type of lasting machine, the machine herein shown is of the class employing a vertically movable toe lasting head where, as a preliminary step to the closing in movement of the wipers, the stock is first wiped up about the sides of the toe by the wiper plates or a suitable toe pad, or both. In the present machine there is shown, as a means for effecting the wiping up action, the toe pad 181, Figs. 21 and 23, which, as the lasting head is elevated, is caused to wipe up the leather about the last and also there to retain it when the wiping plates subsequently advance to break it down over the insole. The pad 181 comprises a facing preferably of leather or other suitable friction material, removably secured as a facing for the flexible sprocket 182. To readily remove the pad for the substitution of differently shaped ones, the ends of the pad (Figs. 22 and 23) are provided with U-shaped clips or brackets 183 which, with the pad as positioned, may be slid longitudinally into a slot 184 in the attachment 185. The bottom of the clip enters the slot, while the side thereof lies against the side of the attachment, acting thereby rigidly to support the ends of the pad. The center of the pad is supported by an underlying segmental shelf or bracket 186 projecting from the sprocket 182 under the rear portion of the pad and provided with a spring-pressed latching pin 187, which, with the pad positioned, may be snapped into an opening in the metal clip 188 secured to the bottom of the pad. By merely withdrawing the pin 187 the pad may be withdrawn longitudinally for the the substitution of another. The attachments 185 at the outer ends of the pad are supported, as are also the ends of the sprocket (see Fig. 24), by pivoted supporting fingers 189 and sliding supporting arms 190 (Fig. 24) which connections, together with the cross bar 191, Fig. 21, and the equalizing wedge 192, may be and preferably are of substantially the same construction as the supporting devices for the heel lasting pad. The toe pad, however, is adapted to be clasped about the toe for the wiping up action by means of the pad clasping lever 193 (Figs. 1 and 21), which is pivoted on the wiper support 146 and jointed to the pad actuating bar 194 (Fig. 21), so that, by movement of the lever, the ends of the pad may be clasped about the toe of the last. The pad clasping lever is provided with a hand latch 195 which controls a pawl 196 adapted to engage with the fixed ratchet 197, so that the pad, when closed in to any given position, may be there retained. In order to adjustably advance the pad, the center of the pad carrier is supported upon the rearwardly extending rack bar 198, which latter is provided with teeth meshing with the pinion 199 connected (Figs. 21 and 24) to be turned by the hand lever 200 at the side of the toe lasting head. The lever is provided with a spring-pressed latching pin 201 engaging the teeth of a ratchet plate 202, so that the lever may be turned and held by its pawl in any desired position, thereby advancing or retracting the pad.

Provision is made for raising and lowering the toe lasting head by means of the foot treadle 203 (Figs. 1 and 3), which latter is connected to rock the transverse elevating shaft 204 and raise the rod 205. The latter is connected at its lower end by an arm to the rock shaft and at its upper end to a sliding head 206 which is mounted to slide in vertical ways 207 and connected to the lasting head support 2.

In the operation of the machine the toe lasting head, having been properly positioned with reference to the toe of the shoe to be lasted, and with the wipers below the level of the insole, the toe pad 181 is tightly clasped about the sides of the toe and there locked by the pad lever 193. The wiper plates are then moved in by the wiper lever 13 to bear against the sides of the toe, and the auxiliary work engaging members 162 are applied to the stock and depressed, as previously described. The entire toe head is then elevated by pressure on the foot treadle 203, the friction of the toe pad acting to wipe up and stretch the stock about the sides of the toe. The operative, holding the wiper lever to press the wipers inward, causes the wipers to close in as soon as he feels them rise above the edge of the insole and thereby wipes the leather in over the insole. As the wipers are closed, foot pressure is shifted from the elevating treadle 203 to the depressing treadle 206 so as to press the in-closing wipers down against the stock. With the toe pad still clasped, thereby preventing slackening of the leather, the wipers may be retracted for the application of the fastening, after which the pad may be unclasped and the lasted shoe unjacked, as previously described. The action of the wipers, as described, often tends to leave the stock somewhat rounded over the shouldered edge of the insole. In order to lay the stock perfectly flat in the shouldered edge (see Figs. 30 and 31) the wipers are preferably closed in again over the insole shoulder after the stock has been fastened and a heavy downward pressure applied to crease the leather over the edge of the insole and flatten it into the shoulder thereof. For this purpose, prior to the unjacking of the shoe, but after the application of the fastening and the unclasping of the toe pad, the wipers are again closed in and forcibly depressed against the fastened stock. While this can be accomplished to some extent by means of the depressing treadle 206, to make this step sufficiently effective there is herein employed additional depressing means of greater leverage and adapted to exert a greatly augmented downward pressure on the head. Such means are herein comprehended in the manually movable depressing lever 209 loosely mounted in the rock shaft 204 and normally held in the position shown against the stop 211 by the spring 210. The rock shaft, however, has fixedly secured thereto the segmental ratchet 212 and, when it is desired to depress the head with the increased power required to flatten the stock, the operative, by grasping the lever handle 213, can move the adjacent hand latch 214 and, by the link connection shown, apply the pawl 215 to the ratchet to lock the lever to the rock shaft and turn the latter to depress the lasting head.

As previously stated, many of the features herein described are applicable to lasting machines of other types than the one herein shown. It is also to be understood that, while the various features of the invention have, for illustrative purposes, been shown embodied in a concrete machine, the invention is not limited either to the machine shown, or to the details of construction or the form or relative arrangement of parts, but that extensive deviations may be made therefrom without departing from the spirit of the invention.

What is claimed is:

1. In a lasting machine, the combination of a last support, end wipers, auxiliary lasting devices movable into operative position for engaging the work in front of the wipers, and means for guiding the auxiliary lasting devices into engagement with the work as they are moved into operative position.

2. In a lasting machine, the combination of a last support, end wipers, side auxiliary lasting devices for engaging the work in front of the wipers, means for adjusting a wiper toward and from the center of the last and for correspondingly adjusting the associated auxiliary lasting device.

3. In a lasting machine, the combination of a last support, wiper carriers, end wipers associated therewith, side grippers for positively engaging the work in front of the wipers, means for adjusting a wiper with relation to its carrier and for correspondingly adjusting the associated gripper.

4. In a lasting machine, the combination of a last support, end wipers, side grippers and end grippers to positively engage the work in advance of the wiper edges, and means for causing closing and opening movements of the wipers and side and end grippers over the shoe sole.

5. In a bed lasting machine, the combination of a last support, end wipers, side grippers and end grippers to engage the work in advance of the wiper edges, and means to move said grippers inwardly over a shoe sole simultaneously with and immediately in advance of the acting edges of said wipers.

6. In a lasting machine, the combination of a last support, end wipers, grippers for positively engaging the work in front of the wipers, arms carrying said grippers, means for adjusting the grippers on said arms and means for moving the wipers and grippers over the sole of a shoe sustained by said support.

7. In a lasting machine, the combination of a last support, end wipers, grippers having teeth for positively engaging the work in front of the wipers, and means to adjust the grippers to regulate the penetration of said teeth.

8. In a lasting machine, the combination of a last support, wiper carriers, end wipers associated therewith, side grippers for positively engaging the work in front of the wipers, a gripper carrier for swinging the grippers into and out of operative position, means for adjusting an end wiper with respect to its carrier toward and from the center of the last, and means controlled by said adjusting means to correspondingly adjust the associated gripper when said grippers are moved into operative position.

9. In a lasting machine, a last support, end wipers, side grippers and a plurality of end grippers to engage the outside of the work and movable with and in front of the wipers in their closing or wiping movements.

10. In a lasting machine, the combination of a last support, end wipers, grippers for positively engaging the work on the same side as and in front of the wipers, said wipers and grippers constituting lasting devices, and means associated with the grippers to engage the insole and level it with respect to the lasting devices.

11. In a lasting machine, the combination of a last support, end wipers, a gripper carrier and grippers mounted thereon, and adapted to engage the work in front of the wipers, said wipers and grippers constituting lasting devices, and adjustable means carried by the gripper carrier to engage the insole of a shoe sustained on said support and position it with respect to the lasting devices.

12. In a lasting machine, the combination of a last support, end wipers, a gripper carrier having grippers and a foot mounted thereon to swing together toward and from the last support said grippers engaging the work in front of the wipers, said foot engaging the insole between the grippers, and means to force said foot downward to position the work after the grippers and foot have been swung into operative relation therewith.

13. In a bed lasting machine, the combination with wiper carriers, means to impart a combined advancing and closing movement to the carriers, of wiper plates supported by the wiper carriers, a locking pin mounted to swing on each end wiper carrier and engaging a wiper plate for adjusting the plate on the carrier relative to the line of advance and a handle for swinging each locking pin.

14. In a bed lasting machine, the combination with wiper carriers, means to impart a combined advancing and closing movement thereto, wiper plates carried by said wiper carriers, a locking pin mounted to swing on each wiper carrier and engaging a wiper plate for adjusting the plate on the carrier about a center substantially co-incident with the center of opening and closing movement of the wiper carriers, and a handle for operating each locking pin.

15. In a bed lasting machine, the combination with wiper carriers, of wiper plates thereon, means for locating said plates on said carriers comprising slots curved from a center coincident with the center of opening and closing movement of the wiper plates, and slot engaging pins by which the plates have sliding adjustment upon the carriers, and means for adjustably holding the said plates by said locating means.

16. In a lasting machine, the combination with a wiper carrier, of a wiper plate removably secured thereto, and a clamping member having a recessed edge to engage the adjacent edge of the wiper plate to removably hold the plate on the carrier.

17. A lasting machine having a wiper carrier, a wiper removably connected thereto, and a clamp for engaging the exterior edge portion of the wiper for retaining it on the carrier, said clamp and wiper having correspondingly beveled engaging edge portions.

18. In a lasting machine, the combination of a heel lasting carriage, a last support, an inclined rest for said support and having a longitudinally extending flange, means for causing relative longitudinal movement between the inclined rest and last support, and an elevating rod adapted to engage said longitudinally extending flange.

19. In a lasting machine, the combination of a heel lasting carriage, a last support, an inclined rest for said support and having a longitudinally extending flange, means for causing relative longitudinal movement between the inclined rest and last support, an elevating rod adapted to engage said longitudinally extending flange, and ratchet and pawl means for locking the elevating rod.

20. In a lasting machine, the combination of a last support, end wipers, means for operating the wipers, and separate means disposed one at each side of the last support for pressing the work against the end wipers to increase the effective wiping action of the wipers as they pass beneath said means.

21. In a lasting machine, the combination of a last support, end wipers, means for operating the wipers, and yielding means comprising auxiliary lasting members, one cooperating with each end wiper at opposite sides of the last support for pressing the work against the end wipers to increase the effective wiping action of the wipers as they pass beneath said means.

22. In a lasting machine, the combination of a last support, end wipers, means for operating the wipers, and auxiliary lasting members one for each wiper for pressing the work against the end wipers to increase the effective wiping action of the wipers as they pass beneath said means, said auxiliary lasting members having a beveled or sloping edge to permit the wipers to wedge beneath the auxiliary lasting devices as they move inward.

23. In a lasting machine, the combination of a last support, end wipers, means for operating said wipers, and auxiliary side lasting devices, one for each end wiper, said auxiliary lasting devices having friction engaging faces to engage the material of the upper and hold it against the end wipers, and means to permit movement of the auxiliary lasting devices with the respective end wipers as they move inward.

24. In a lasting machine, the combination of a last support, end wipers, means for operating said end wipers, separate and independently movable auxiliary lasting members coöperating with said wipers at the side of the shoe to hold the material against said wipers, and means permitting the auxiliary lasting devices to be adjusted to aline with the shoe.

25. In a lasting machine, the combination of a last support, end wipers, means for operating the end wipers, separate auxiliary lasting members coöperating with each of said wipers at the side portions of the shoe to hold the material against said wipers as they move inward, and supporting means for said auxiliary lasting members to permit them to be moved independently by the end wipers during the wiping action.

26. In a lasting machine, the combination of a last support, side wiping means for wiping the upper material of a shoe inward, separate auxiliary lasting members for said wiping means to hold the material against the wiping means during the wiping action, and a head carrying said separate auxiliary lasting members and mounted to swing said auxiliary lasting members into and out of operative position with respect to the wiping means.

27. In a lasting machine, the combination of a last support, wiping means for wiping the upper material of a shoe inward, auxiliary lasting members mounted to contact with the upper material and hold the same against the wiping means, and means for adjusting the auxiliary lasting devices toward and from the center of the shoe sole sustained by said last support.

28. In a lasting machine, the combination of last supporting means, wiping means for wiping the upper material of a shoe inward, independently movable auxiliary lasting members, arms carrying said members, and means for independently adjusting the arms to move said members relatively inward.

29. In a lasting machine, the combination of a last support, end wipers, and a hold down comprising pivotally mounted bearing arms each carrying an insole engaging member, and means normally acting to separate said members.

30. In a lasting machine, the combination of a last support, end wipers, and a hold down comprising bearing arms each carrying an insole engaging member loosely mounted thereon, and means normally acting to separate said members.

31. In a lasting machine, the combination of a swinging arm, a hold down arm jointed thereto and carrying bearing arms, and a loosely sustained sole engaging member carried by each of said bearing arms.

32. In a lasting machine, the combination of a swinging arm, a hold down arm jointed thereto and carrying bearing arms, and a sole engaging member carried by each of said bearing arms, said sole engaging members being conformable to the sole of the shoe being lasted.

33. In a lasting machine, the combination of last supporting means, wiper means, a hold down arm carrying bearing arms, a sole engaging member carried by each of said bearing arms, and adapted to swing with relation thereto, and stops to maintain said members in alinement with the general longitudinal direction of a shoe sole sustained by the supporting means.

34. In a lasting machine, the combination of a last support, end wipers, a flexible member adapted to conform to the shape of the shoe at the end thereof, a facing pad for said flexible member, supporting fingers for said flexible member and pad, depending supports carried by the supporting fingers, and means connected to the pad for detachably engaging said supports.

35. In a lasting machine, the combination of a last support, wiping means for wiping the upper material of a shoe inward, a pad for engaging the end portion of a shoe sustained by said support, means for moving the wipers and pad upward about the shoe in drawing the upper to the last, and manually controlled means for bodily adjusting the position of said pad with relation to the wiping means in a direction longitudinally of the shoe to adjust the same for different lengths thereof.

36. In a lasting machine, the combination of last supporting means, wiping means for wiping the upper material of a shoe inward, a flexibly sustained pad for engaging the end portion of a shoe sustained by said support, means for moving the pad upward about the shoe in drawing the upper to the last, a bar for centrally supporting said pad, and means for adjusting said central supporting bar in a direction longitudinally of a shoe sustained by said supporting means to position the pad longitudinally for different lengths of shoes.

37. In a lasting machine, the combination of last supporting means, wiping means for wiping the upper material of a shoe inward, a flexibly sustained pad for engaging and conforming to the end portion of a shoe sustained by said support, a rack bar for supporting said pad, a pinion engaging the rack bar, and hand operated means for operating the pinion to position the pad longitudinally with relation to the wiping means for different lengths of shoes.

38. In a bed lasting machine, the combination with a heel lasting head, and last supporting means, of heel lasting wipers and auxiliary lasting devices or grippers on said head, and means for adjusting the wipers and grippers on the head for use with rights or lefts.

39. In a bed lasting machine, the combination with wiper carriers, wiper plates, means for locating the plates upon the carriers, comprising inter-engaged curved wall portions through which the plates have sliding adjustment upon the carriers, and means for moving and for holding each plate in its selected position of adjustment, comprising a coöperating slot and locking pin, one upon the plate and the other upon the carrier.

40. In a lasting machine, the combination with a last support, a pair of wipers and coöperating grippers, means to advance and close the same, and means to adjust one wiper with relation to the other to start its closing movement near the center line of advance, and means to correspondingly determine the path of the gripper movement.

41. In a lasting machine, a heel lasting head having end wipers, means to cause the said wipers to advance and close in, and means to exert an inward draft on the stock at the fore-portions of the heel while the wipers are advanced.

42. A lasting machine having a last support, end wipers, and positive work-engaging means for the heel, positive work-engaging means for the side, and means to advance the heel engaging means relatively to the side engaging means.

43. A lasting machine having a lasting head, wiping means, pivoted work-engaging devices mounted on the lasting head, means to advance the wiping means relatively to the work-engaging devices and simultaneously to cause movement of the latter about the pivots on the lasting head.

44. A lasting machine having wiping means, positive work-engaging means, and projecting devices on the wiping means to cause closing-in movement of the work-engaging means.

45. A lasting machine having wiping means, work-engaging means adapted to be moved simultaneously with said wiping means, and means for adjusting the work-engaging means for rights or lefts.

46. In a lasting machine, a shoe support, end wipers, a pad having pivoted end supports, slidable members carrying said end supports, and means both to advance and differentially swing said slidable members.

47. In a lasting machine, a shoe support, end wipers, a pad having pivoted end supports, supporting means for said end supports mounted for movement toward and from said pad, and means to differentially move said supporting means toward or from the pad.

48. In a lasting machine, shoe supporting means, end wipers, a pad having end supports for the same, and wedge equalizing means for differentially moving said supports.

49. In a lasting machine, shoe supporting means, end wipers, a pad, pivoted end supports, means to advance said supports, and means also to move said supports with their pivots yieldingly and differentially toward or away from the pad.

50. In a lasting machine, shoe supporting means, end wipers, a pad, slide bars for supporting the end of the pad, means to advance said slide bars, and means automatically conformable to the shape of the last to swing said slide bars toward or away from the pad.

51. In a lasting machine, shoe supporting means, end wipers, a hold down, means to exert a pressure on the last toward the wipers, means to release the hold down, and means simultaneously to relieve the pressure on the last.

52. In a lasting machine, a longitudinally movable lasting head, a hand wheel on the head for positioning the last, a ratchet and pawl for locking the hand wheel, a depending pawl releasing lever, and a cam on the machine frame for actuating the releasing lever.

53. In a lasting machine, the combination with a last support and end wiping means to wipe the upper material inward, of means independently movable with and by each of the wipers to increase the frictional hold thereof upon the stock during the wiping action.

54. In a lasting machine, the combination with wiping means at each side of the shoe end portion, of pivoted and independently movable work-engaging means coacting with the wiping means at each side of the shoe to pinch the stock against the wiping means, said work engaging means being movable with and by the wiping means.

55. In a lasting machine, the combination with a pad, of pad supporting means having means for supporting the pad thereon while permitting free longitudinal withdrawal of the pad.

56. In a lasting machine, the combination with a toe lasting head, of a toe pad, toe lasting wipers, and means for longitudinally adjusting the toe pad independently of the wipers.

57. In a lasting machine, the combination of a last support, end wipers to wipe the upper material inward, auxiliary lasting devices, carriers for said devices on which said devices are adjustably mounted, and means to permit the said devices to engage the upper material in front of the wipers and be moved inward by the wiper movement.

58. In a lasting machine, the combination of a last support, end wipers, levers for adjusting the end wipers, auxiliary lasting devices, means connected to said levers for positioning the auxiliary lasting devices as they are moved into operative position, and means to move the wipers and auxiliary lasting devices inward.

59. In a bed lasting machine, the combination of a last support, end wipers to wipe the upper material inward, grippers extending forward and beyond the wipers, pivotally mounted arms carrying said grippers, and means for moving the wipers and grippers inward.

60. In a lasting machine, the combination of a lasting carriage, a wiper carrying support, a saddle or intermediate support pivotally connecting the lasting carriage and wiper carrying support, segmental guides sustained by said saddle or intermediate support, complemental portions connected to the wiper carrying support and engaging said segmental guides, a sliding rack block having operative engagement with the wiper carrying support, and means for sliding said block.

61. In a lasting machine, a shoe support, a head, wipers on said head for acting at each side of the end of the shoe to lay the upper over the sole, a pad carried by the head and having pivoted end supports, slidable members carrying said end supports, means to advance and swing said end supports, separate means for operating the wipers, and means for raising the head while the pad is in contact with the shoe.

62. In a bed lasting machine, the combination of a head, end wiper plates carried by the head, a flexible pad also carried by the head, independent hand levers for operating the wiper plates and closing the pad about the end of a shoe, means for tilting the head longitudinally and transversely to properly position the wiper plates and pad with respect to the bottom surface of the last, and means for raising the head bodily and with it the pad and wipers when the pad is closed against the end of the shoe and for bodily lowering the head.

63. In a bed lasting machine, the combination of a base, a lasting carriage thereon, a wiper carrying support carrying wiper plates, shoe supporting means, a saddle pivotally connecting the lasting carriage and wiper carrying support, and an interlocking arc-shaped rib and groove connection located between the lasting carriage and wiper carrying support to permit lateral rocking movement of the wiper carrying support and direct that movement about an axis extending lengthwise of the shoe and located substantially in the plane of the bottom face thereof, one member of said interlocking arc-shaped rib and groove connection being mounted on the pivotally supported saddle which connects the lasting carriage and wiper carrying support, and the other on the wiper carrying support.

64. In a bed lasting machine, the combination of a base, a lasting carriage thereon, a wiper carrying support carrying wiper plates, shoe supporting means, a saddle pivotally connecting the lasting carriage and wiper carrying support, an interlocking arc-shaped rib and groove connection located between the lasting carriage and wiper carrying support to permit lateral rocking movement of the wiper carrying support and direct that movement about an axis extending lengthwise of the shoe and located substantially in the plane of the bottom face thereof, one member of said interlocking arc-shaped rib and groove connection being mounted on the pivotally supported saddle which connects the lasting carriage and wiper carrying support, and the other on the wiper carrying support, and an adjusting device carried by the saddle for tilting the wiper carrying support.

65. In a bed lasting machine, the combination of a base, a lasting carriage thereon, a wiper carrying support carrying wiper plates, shoe supporting means, a saddle pivotally connecting the lasting carriage and wiper carrying support, and an interlocking arc-shaped rib and groove connection located between the lasting carriage and wiper carrying support to permit lateral rocking movement of the wiper carrying support and direct that movement about an axis extending lengthwise of the shoe and located substantially in the plane of the bottom face thereof, one of said interlocking connections being disposed adjacent the pivotal point of the saddle and the other near the other end of the saddle, and one member of each of said interlocking connections being mounted on the saddle and the other on the wiper carrying support.

66. In a bed lasting machine, the combination of a lasting head carrying end wipers and a pad, treadle means for raising the head to cause the wipers to lay the upper about the end of the last and to lower the head to cause the wipers to act close to the plane of the bottom of the last in laying the edge of the upper over the last, and additional means to powerfully depress the head while the wipers are over the bottom of the last to lay the stock flat.

67. In a bed lasting machine, the combination of a lasting head carrying end wipers and a pad, treadle means for raising the head to cause the wipers to lay the upper about the end of the last and to lower the head to cause the wipers to act close to the plane of the bottom of the last in laying the edge of the upper over the last, and a hand lever additional thereto for powerfully depressing the wipers onto the bottom of the last.

68. In a bed lasting machine, the combination of a toe lasting head, toe wipers carried by said head to wipe the upper over the toe end of the last, means for bodily raising and lowering the head to position the wipers with respect to the bottom of the last that they may properly wipe the upper thereover, and additional means for depressing the wipers onto the bottom of the last after the wiping action.

69. In a bed lasting machine, the combination of a toe lasting head, toe wipers carried by said head to wipe the upper over the toe end of the last, means for tilting the head to bring the wipers substantially into the plane of the last bottom, means for bodily raising and lowering the head to position the wipers with respect to the bottom of the last that they may properly wipe the upper thereover, and additional means for depressing the wipers onto the bottom of the last after the wiping action.

70. In a bed lasting machine, the combination of a toe lasting head, toe wipers carried by said head to wipe the upper over the toe end of the last, a treadle, connections between the treadle and head for raising and lowering the head to position the wipers for the wiping action, and a hand lever for giving an additional depression to the head to lay the stock upon the insole and crease the upper over the edge of the insole.

71. In a bed lasting machine, the combination of a vertically movable wiper carrying member, means for raising the member, and other means for depressing said member, said other means being adapted for the application of greater force than the first named means.

72. In a bed lasting machine, the combination of wipers for acting at the end portions of a shoe to wipe the upper over the insole, wiper depressing means adapted to be actuated simultaneously with the closing-in movement of the wipers, and other wiper depressing means of augmented force to cause the wipers to act upon the stock after the application of the fastenings.

73. In a bed lasting machine, the combination of wipers to act upon the end portion of a shoe and wipe the upper over the insole, foot lever elevating and depressing means for the wipers, and means other than the foot lever means for depressing the wipers with augmented force.

74. In a bed lasting machine, the combination, with a movable lasting head, of means for positioning it for the lasting operation, a last support thereon, last positioning and heel band clasping means adapted to be locked for the lasting operation, means automatically to release said positioning and clasping means as the head returns from lasting position, and means also to effect release of the clasping means independent of the position of the head.

In testimony whereof, I have signed my name to this specification, in the presence of two subscribing witnesses.

THOMAS GUSTAVE PLANT.

Witnesses:
EDWARD H. J. COOK,
NATALIE TOWARD.